United States Patent
Suman et al.

(10) Patent No.: US 10,266,126 B2
(45) Date of Patent: Apr. 23, 2019

(54) IMAGING DEVICE PROTECTOR AND CLEANER

(71) Applicant: Gentex Corporation, Zeeland, MI (US)

(72) Inventors: Danny L. Suman; Luke W. Koops, Zeeland, MI (US); William L. Tonar, Holland, MI (US); Danny L. Minikey, Jr., Fenwick, MI (US); Kristopher R. Green, Allendale, MI (US); Timothy L. Pawlowski, West Olive, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/818,079

(22) Filed: Nov. 20, 2017

(65) Prior Publication Data

US 2018/0072240 A1    Mar. 15, 2018

Related U.S. Application Data

(62) Division of application No. 14/286,012, filed on May 23, 2014, now abandoned, which is a division of application No. 13/557,070, filed on Jul. 24, 2012, now Pat. No. 8,753,025.

(60) Provisional application No. 61/511,749, filed on Jul. 26, 2011.

(51) Int. Cl.
| | |
|---|---|
| *B60R 11/04* | (2006.01) |
| *G03B 11/04* | (2006.01) |
| *G03B 17/00* | (2006.01) |
| *G03B 17/08* | (2006.01) |

(52) U.S. Cl.
CPC ............ *B60R 11/04* (2013.01); *G03B 11/043* (2013.01); *G03B 17/00* (2013.01); *G03B 17/08* (2013.01)

(58) Field of Classification Search
CPC .............. B60R 11/04; B60R 2300/802; G02B 27/0006
See application file for complete search history.

(56) References Cited

U.S. PATENT DOCUMENTS

| | | |
|---|---|---|
| 3,659,307 A | 5/1972 | Vitou |
| 4,410,563 A | 10/1983 | Richter et al. |
| 4,699,478 A | 10/1987 | Tsui et al. |
| 5,068,770 A | 11/1991 | Baziuk |
| 5,121,200 A | 6/1992 | Choi |

(Continued)

FOREIGN PATENT DOCUMENTS

| | | |
|---|---|---|
| EP | 1529688 A1 | 5/2005 |
| EP | 1227683 B1 | 7/2006 |
| WO | 2011014497 A1 | 2/2011 |

*Primary Examiner* — Noam Reisner
(74) *Attorney, Agent, or Firm* — Price Heneveld LLP; Bradley D. Johnson

(57) ABSTRACT

An imaging device enclosure for a vehicle including a housing having an image device aperture. A motor is disposed in the housing and is operably connected with a mobile wedge. The mobile wedge is operable between an extended position and a retracted position. An imaging device is slidably connected with the mobile wedge and is movable between the retracted position corresponding to the extended position of the mobile wedge and the extended position corresponding to the retracted position. A flexible boot is disposed over the image device aperture. The flexible boot defines a flexible opening. The imaging device protrudes through the flexible opening when the imaging device is in the extended position.

16 Claims, 21 Drawing Sheets

(56) References Cited

U.S. PATENT DOCUMENTS

| | | |
|---|---|---|
| 5,315,333 A | 5/1994 | Nash |
| 5,418,567 A | 5/1995 | Boers et al. |
| 5,761,556 A | 6/1998 | Ichino |
| 6,138,319 A | 10/2000 | Benoit |
| 6,607,606 B2 | 8/2003 | Bronson |
| 6,619,806 B2 | 9/2003 | Akami et al. |
| 6,731,867 B1 | 5/2004 | Sherwin |
| 6,911,997 B1 | 6/2005 | Okamoto et al. |
| 7,104,657 B2 | 9/2006 | Sherwin |
| 7,355,629 B2 | 4/2008 | Lang et al. |
| 7,387,454 B2 | 6/2008 | Kikuchi et al. |
| 7,579,939 B2 | 8/2009 | Schofield et al. |
| 7,630,624 B2 | 12/2009 | Chang |
| 7,813,639 B2 | 10/2010 | Yoneji |
| 7,883,064 B2 | 2/2011 | Luft et al. |
| 7,891,886 B2 | 2/2011 | Schuetz |
| 7,965,336 B2 | 6/2011 | Bingle et al. |
| 8,031,224 B2 | 10/2011 | Linsenmaier et al. |
| 8,077,406 B2 | 12/2011 | Hachitani et al. |
| 8,118,501 B2 | 2/2012 | Buschmann |
| 8,497,907 B2 | 7/2013 | Barefoot et al. |
| 9,444,984 B2 * | 9/2016 | Scudder ................. B60R 11/04 |
| 2005/0275738 A1 | 12/2005 | Arai |
| 2006/0256459 A1 * | 11/2006 | Izabel .................... B60R 11/04 |
| | | 359/872 |
| 2007/0132610 A1 | 6/2007 | Guernalec et al. |
| 2007/0223899 A1 | 9/2007 | Snow |
| 2011/0033663 A1 | 2/2011 | Svec et al. |
| 2011/0266375 A1 * | 11/2011 | Ono ..................... B60S 1/0848 |
| | | 239/589 |

\* cited by examiner

IMAGING DEVICE PROTECTOR AND CLEANER

CROSS-REFERENCE TO RELATED APPLICATION

This application is a divisional of and claims priority to U.S. patent application Ser. No. 14/286,012, filed on May 23, 2014, entitled "IMAGING DEVICE PROTECTOR AND CLEANER," which is a divisional of U.S. patent application Ser. No. 13/557,070 (now U.S. Pat. No. 8,753,025), filed on Jul. 24, 2012, entitled "IMAGING DEVICE PROTECTOR AND CLEANER, which claims priority to and the benefit under 35 U.S.C. § 119(e) of U.S. Provisional Patent Application No. 61/511,749, filed on Jul. 26, 2011, entitled "IMAGING DEVICE PROTECTOR AND CLEANER," the entire disclosures of which are hereby incorporated herein by reference.

BACKGROUND OF THE INVENTION

The present invention concerns an imaging device protector and cleaner, and more particularly relates to an imaging device enclosure that protects and cleans a lens of the imaging device and which can be used on vehicles.

SUMMARY OF THE INVENTION

One aspect of the present invention includes an imaging device enclosure for a vehicle including a housing having an image device aperture. A motor is disposed in the housing and is operably connected with a mobile wedge. The mobile wedge is operable between an extended position and a retracted position. An imaging device is slidably connected with the mobile wedge and is movable between the retracted position corresponding to the extended position of the mobile wedge and the extended position corresponding to the retracted position. A flexible boot is disposed over the image device aperture. The flexible boot defines a flexible opening. The imaging device protrudes through the flexible opening when the imaging device is in the extended position.

Another aspect of the present invention includes an imaging device enclosure including a housing disposed on an external panel of a vehicle having a bulbous projection. An imaging device is at least partially disposed in the bulbous projection. A shutter is disposed over the bulbous projection and is operable between an obstructing position and an unobstructing position. A motor is disposed in the housing and is operably connected with the shutter. Actuation of the motor moves the shutter from the obstructing position to the unobstructing position.

Yet another aspect of the present invention includes an imaging device enclosure including a base housing. An imaging device and a motor are disposed in the base housing. A shutter housing is connected with the base housing. A shutter tube is disposed in the shutter housing and includes a lens aperture. The shutter tube is operably connected with the motor and is operable between a lowered position and a raised position. A lens of the imaging device is aligned with the lens aperture when the shutter tube is in the raised position.

Yet another aspect of the present invention includes an imaging device enclosure for a vehicle having a housing. An imaging device is disposed in the housing and is operable between a raised position and a lowered position. A cam is operably coupled to the imaging device. A motor is disposed in the housing and is connected with a cam. Activation of the motor rotates the cam to a first position corresponding with the raised position of the imaging device. Subsequent activation of the motor rotates the cam to a second position corresponding with the lowered position of the imaging device.

In still another embodiment of the present invention, an imaging device enclosure is provided that both protects and cleans an imaging device lens of an image device before each use. The image device is adapted to be mechanically withdrawn into a housing to a non-deployed position and extended outwardly from the housing to a deployed position for purposes of capturing image data.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
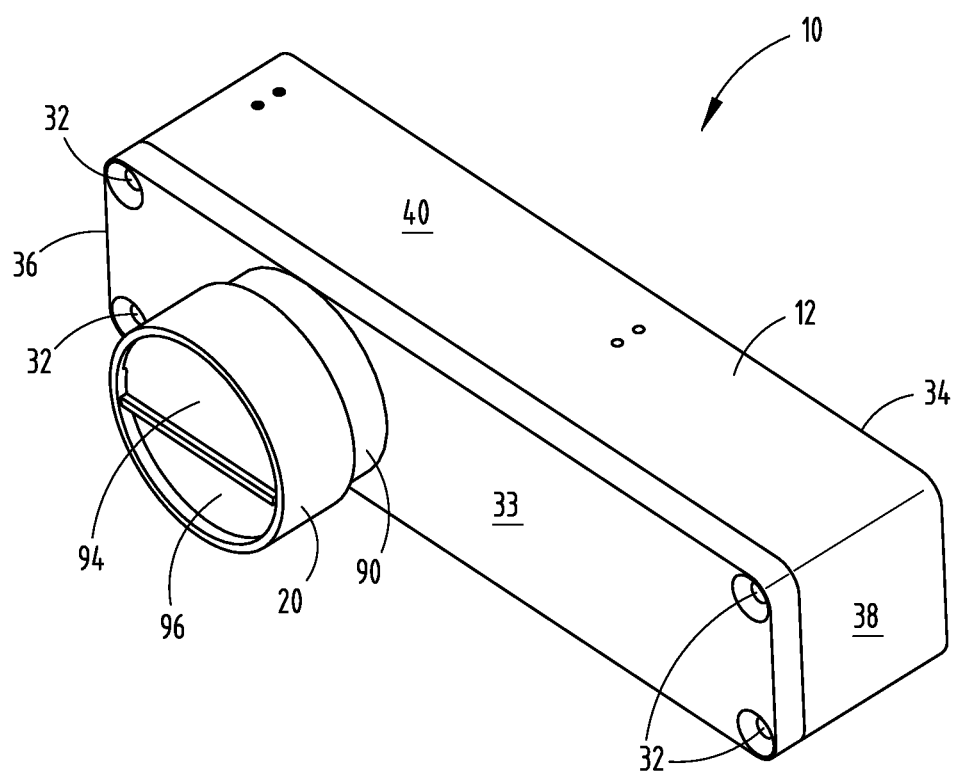
FIG. 1 is a top perspective view of one embodiment of an imaging device enclosure of the present invention.
Figure 2:
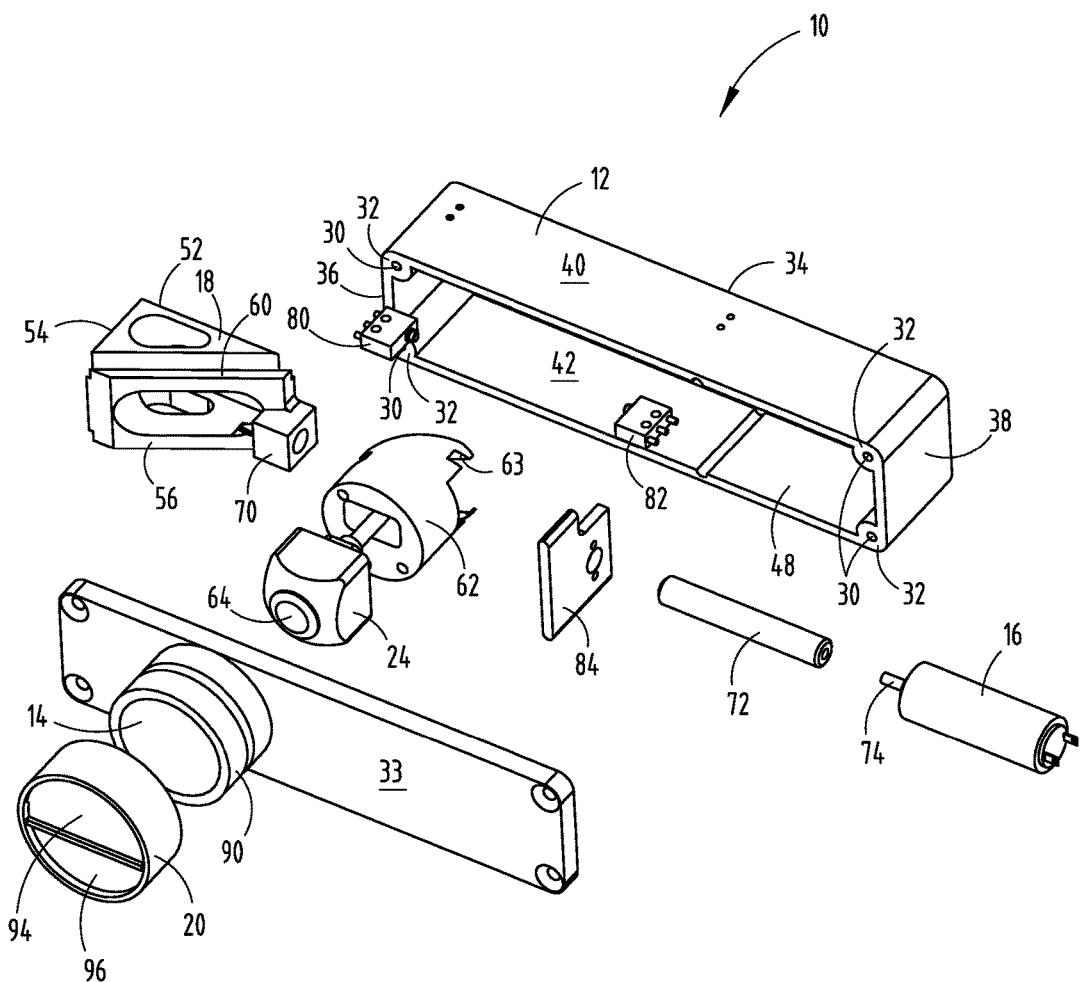
FIG. 2 is a top perspective exploded view of the imaging device enclosure of FIG. 1.
Figure 3:
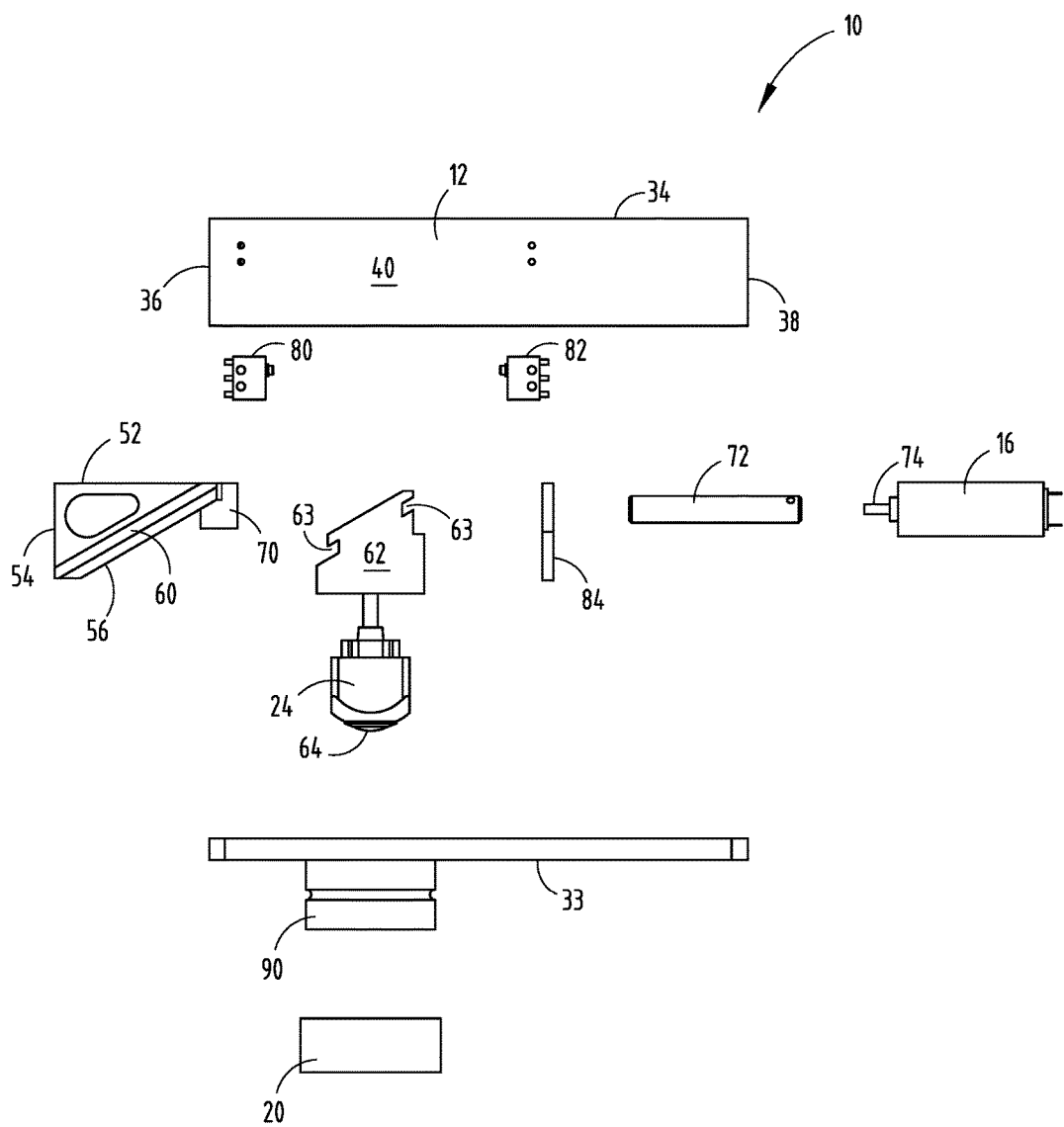
FIG. 3 is a top plan exploded view of the imaging device enclosure of FIG. 1.
Figure 4:
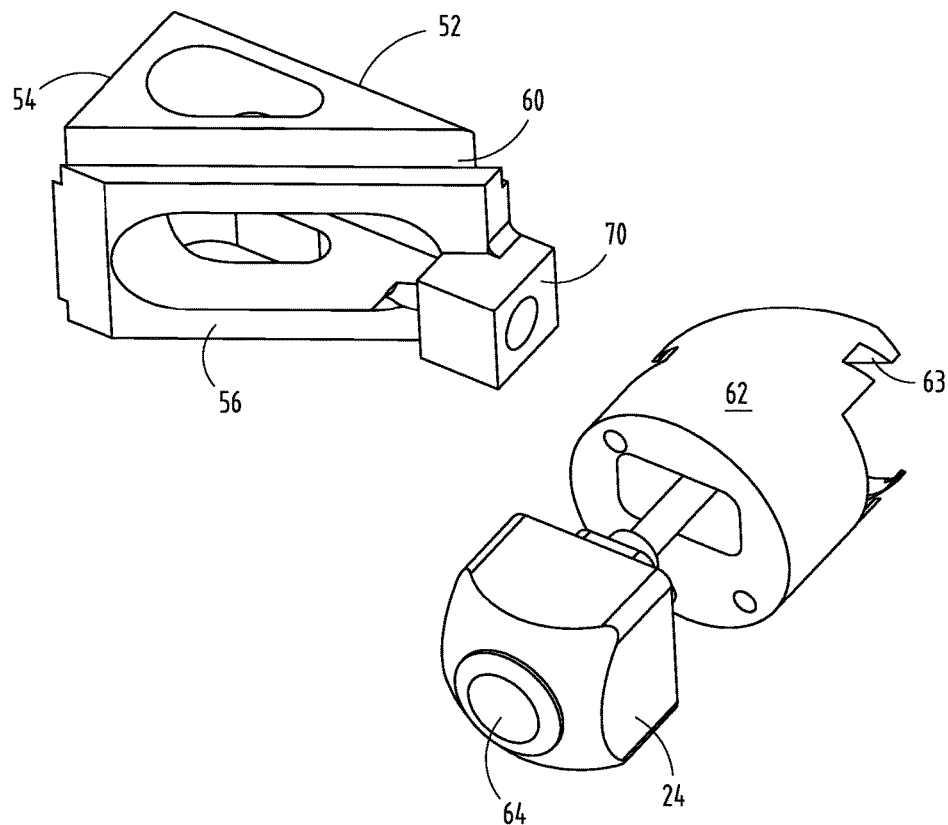
FIG. 4 is a top perspective view of an imaging device and a mobile wedge.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 8:
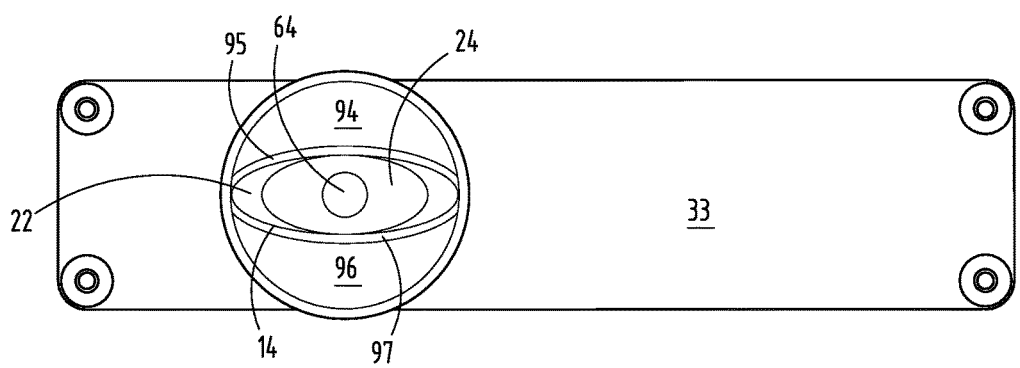
FIG. 8 is a front elevational view of the imaging device of FIG. 1 in a closed open position.
Figure 9:
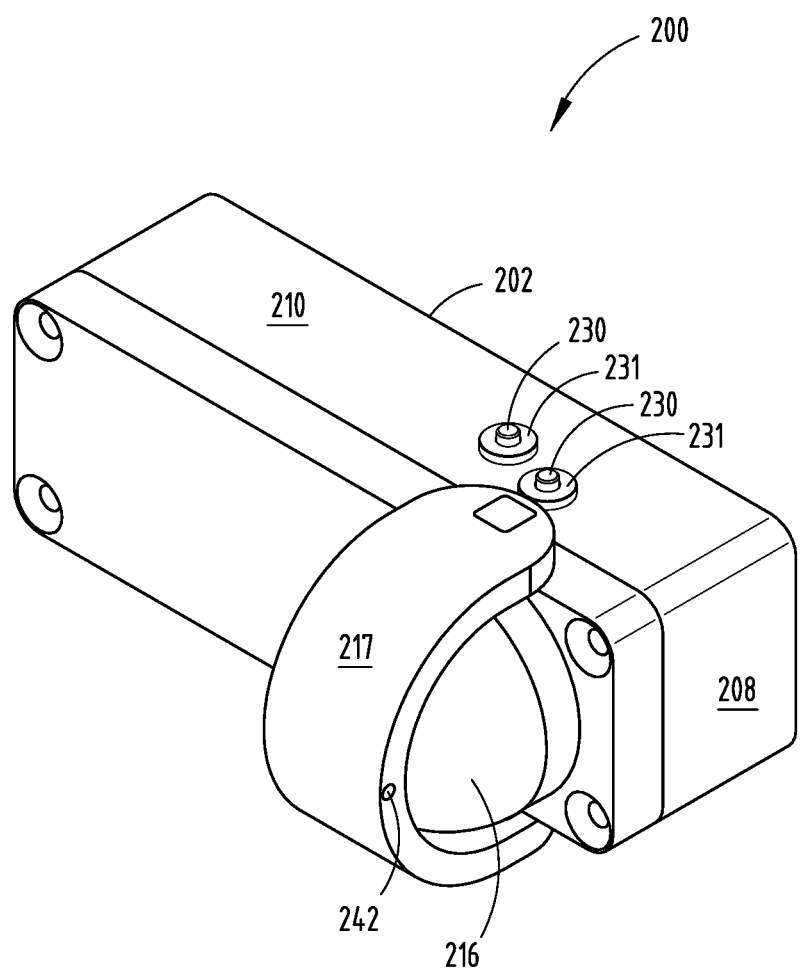
FIG. 9 is a top perspective view of another embodiment of an imaging device enclosure of the present invention.
Figure 10:
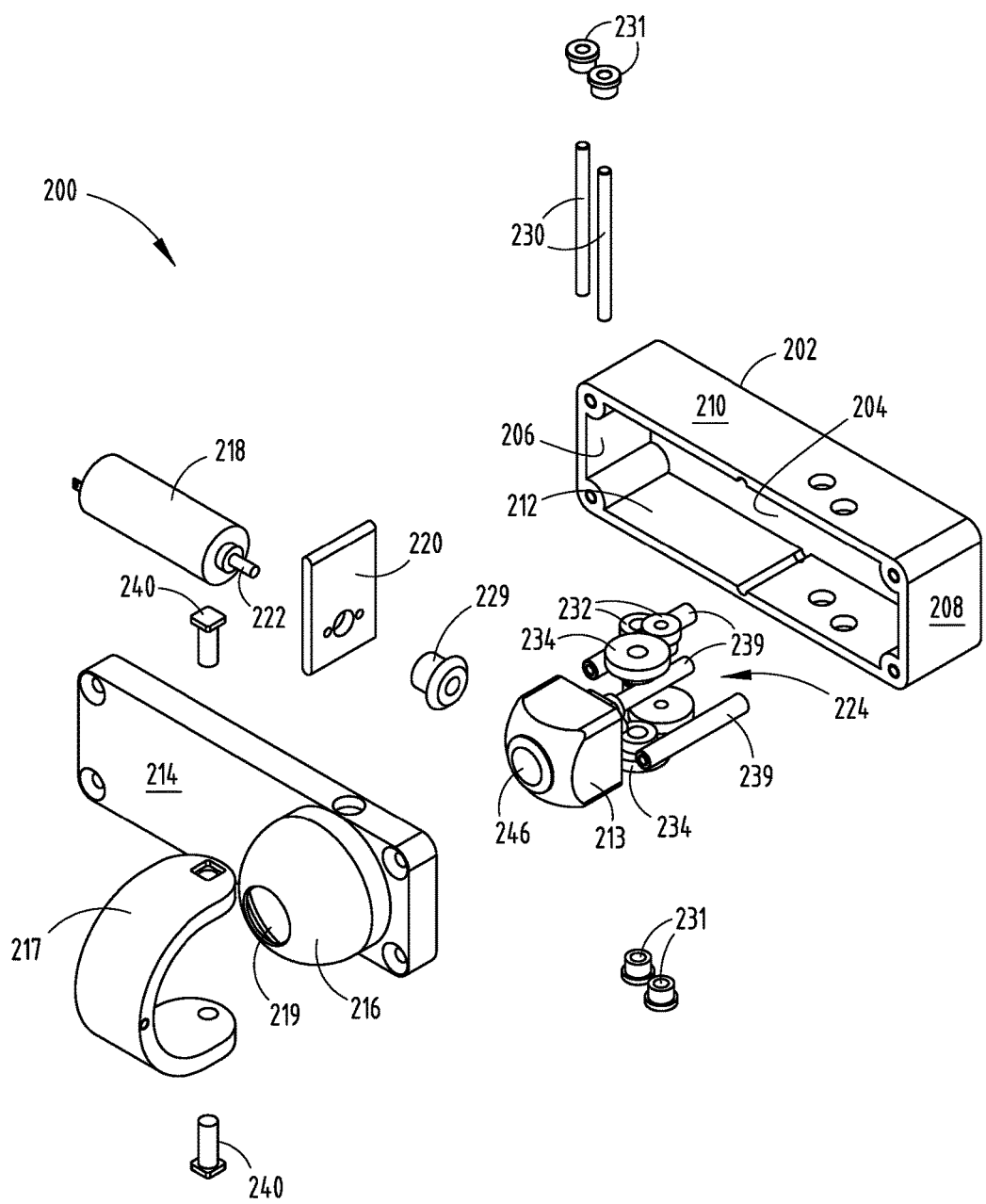
FIG. 10 is a top perspective exploded view of the imaging device of FIG. 9.
Figure 11:
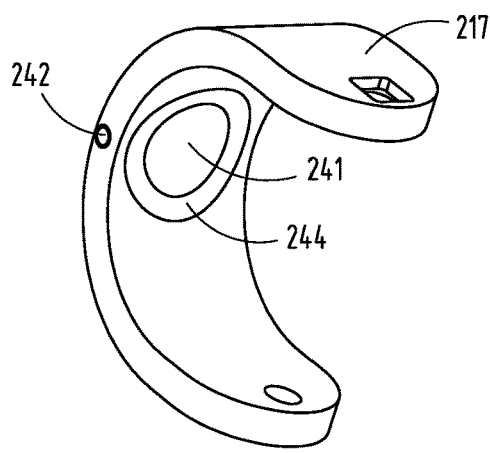
FIG. 11 is a top perspective view of a shutter of the imaging device of FIG. 9.
Figure 12:
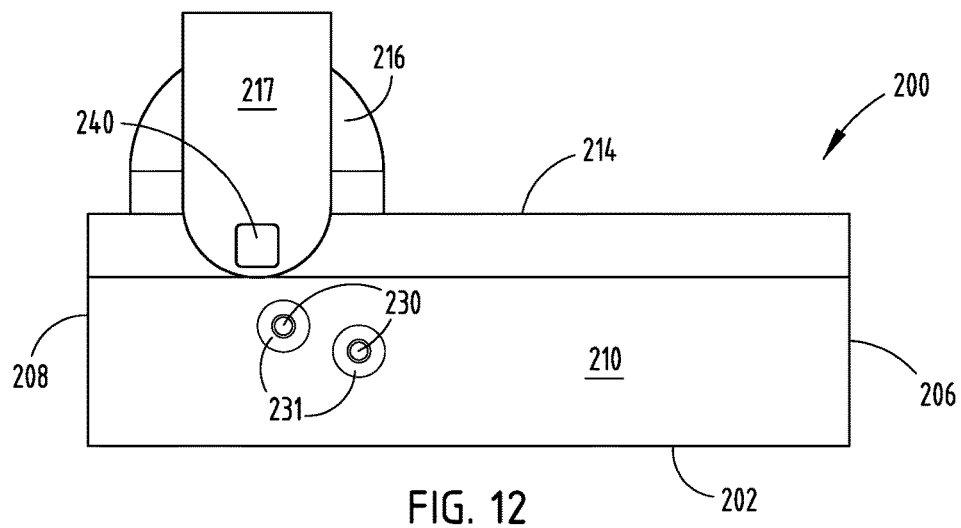
FIG. 12 is a top plan view of the imaging device of FIG. 9 with the shutter in an obstructing position.
Figure 13:
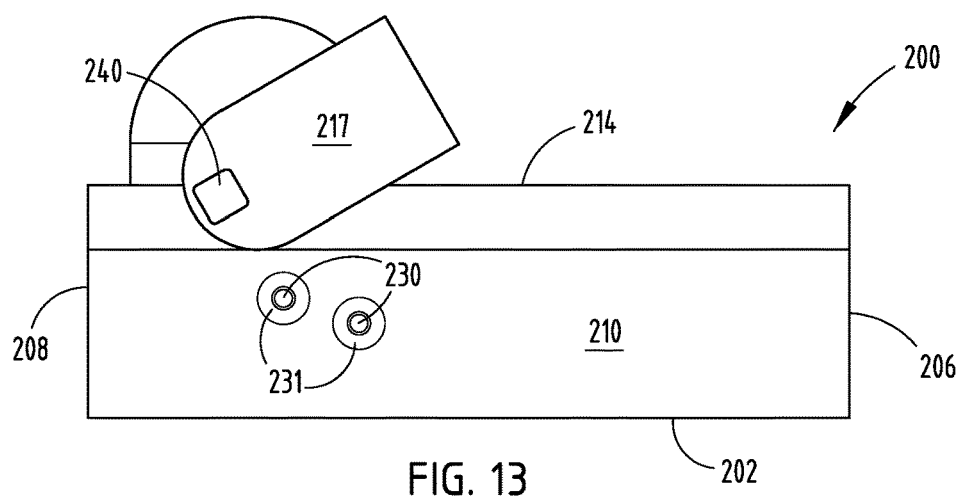
FIG. 13 is a top plan view of the imaging device of FIG. 9 with the shutter in an unobstructing position.
Figure 14:
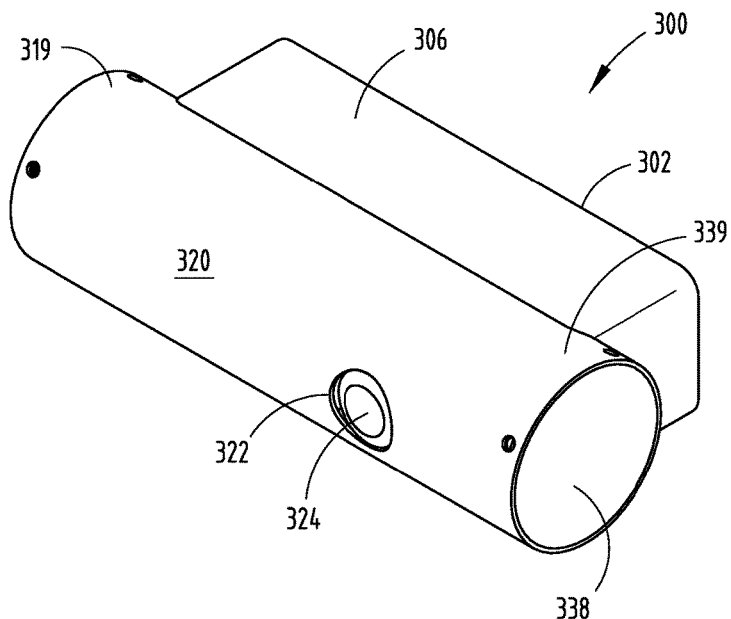
FIG. 14 is a top perspective view of another embodiment of an imaging device enclosure of the present invention with the shutter tube raised.
Figure 15:
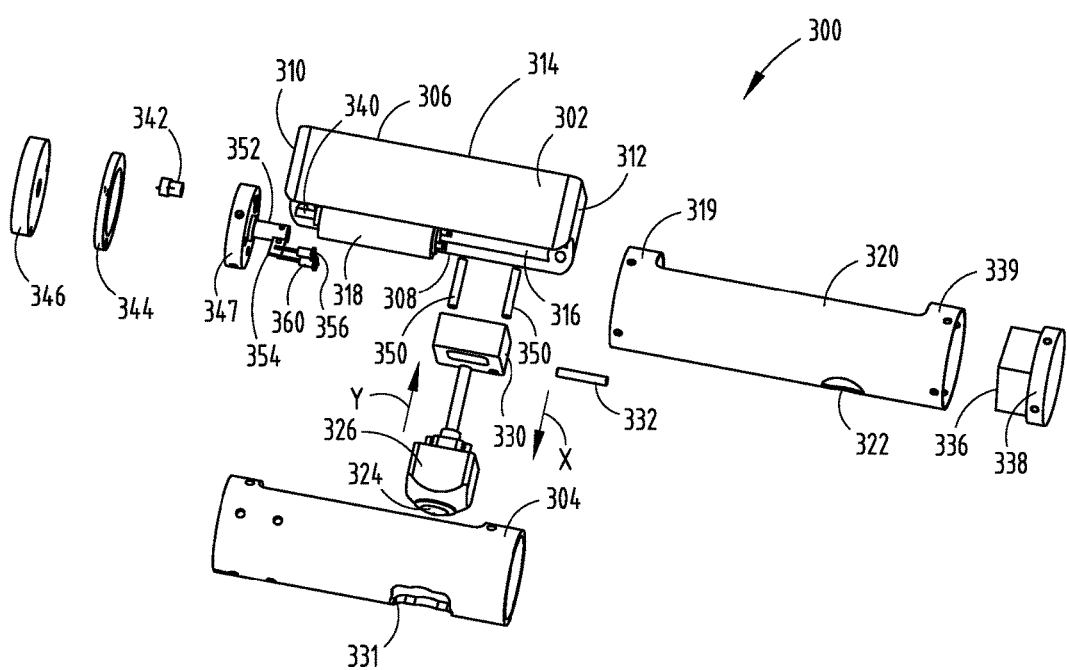
FIG. 15 is a top perspective exploded view of the imaging device enclosure of FIG. 14.
Figure 16:
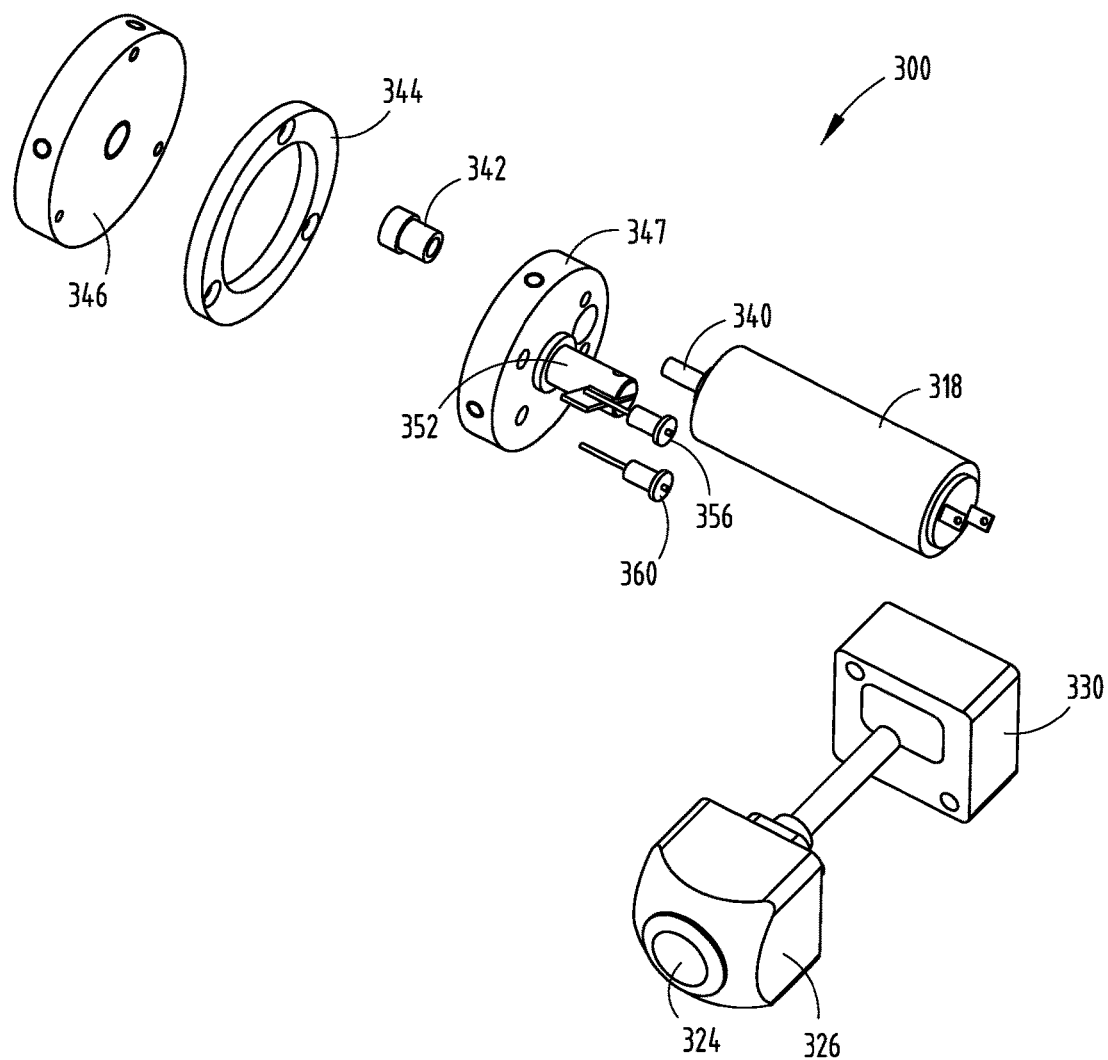
FIG. 16 is a top perspective exploded view of an imaging device of the imaging device enclosure of FIG. 14.
Figure 17:
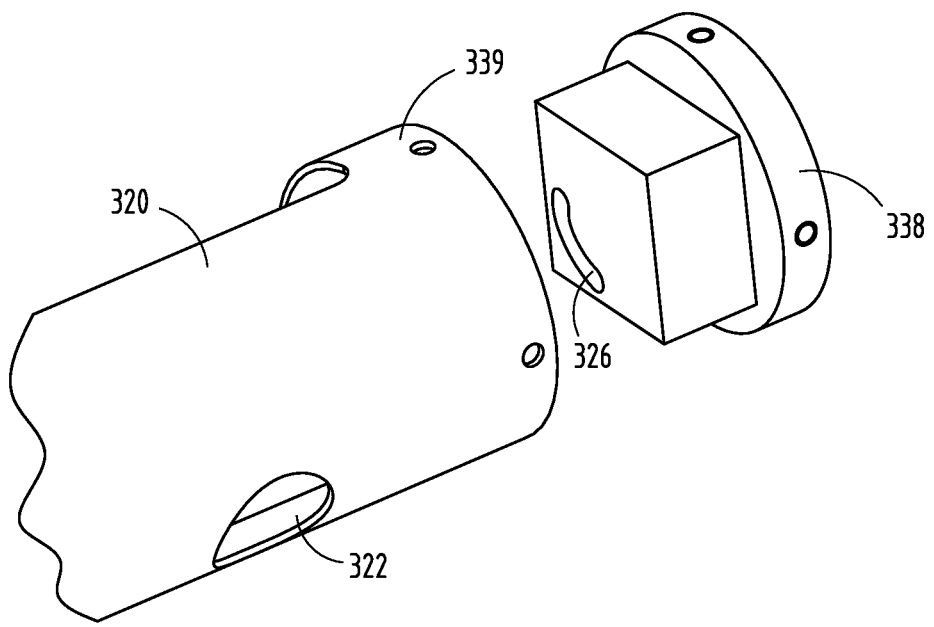
FIG. 17 is a top perspective view of a cam lift of an imaging device of the imaging device enclosure of FIG. 14.
Figure 18:
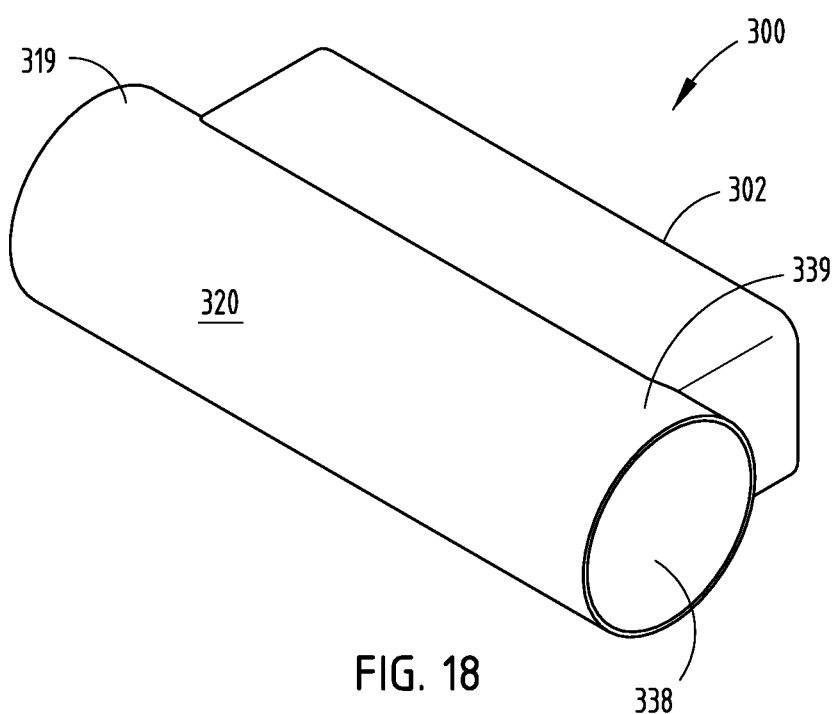
FIG. 18 is a top perspective view of the imaging device of FIG. 14 with the shutter tube lowered.

As shown in FIGS. 1-8, reference number 10 generally designates an imaging device enclosure for a vehicle including an elongate housing 12 having an image device aperture 14 (FIG. 8). A motor 16 is disposed in the elongate housing 12 and is operably connected with a mobile wedge 18. The mobile wedge 18 is operable between an extended position (FIG. 1) and a retracted position (FIG. 8). The imaging device 10 is slidably connected with the mobile wedge 18 and is movable between a non-deployed position corresponding to the extended position of the mobile wedge 18 and a deployed position corresponding to the retracted position. A flexible boot 20 is disposed over the image device aperture 14. The flexible boot 20 defines a flexible opening 22. An imaging device 24 protrudes through the flexible opening 22 when the imaging device 24 is in the extended position.

Referring again to FIGS. 1-8, one embodiment of the elongate housing 12 is adapted to support the imaging device 24 therein. The imaging device enclosure 10 is generally rectangular and includes mechanical fastener apertures 30 at each of four forward corners 32 for receiving mechanical fasteners that secure a cover plate 33 to the elongate housing 12. The elongate housing 12 has a rear wall 34, first and second side walls 36, 38, a top wall 40, and a bottom wall 42. The cover plate 33 and elongate housing 12 define a cavity 48 therebetween. The mobile wedge 18 is disposed inside the elongate housing 12 and includes a base wall 52 that moves along a portion of the rear wall 34 of the elongate housing 12. The mobile wedge 18 further includes an abutment wall 54 that is orthogonal to the base wall 52 and a slanted wall 56 that extends at an angle relative to the base wall 52 and the abutment wall 54. The slanted wall 56 of the mobile wedge 18 is at approximately a 30 degree angle relative to the base wall 52, but the slanted wall 56 of the mobile wedge 18 could be at any angle between 85 degrees and 5 degrees relative to the base wall 52. The slanted wall 56 includes a track 60 configured to interface with a keyed imaging device support 62 having a keyed track interface 63. The track 60 allows the keyed imaging device support 62 to move between a deployed position where image data can be captured through a lens 64 of the imaging device 24 and a non-deployed position where the imaging device 24 is safely stored inside the housing. The imaging device 24 can also be stopped at any of a variety of intermediate positions between the deployed and non-deployed positions.

The interface of the slanted wall 56 and the base wall 52 includes a threaded rod receiver 70 configured to engage a threaded rod 72. The threaded rod 72 is connected with a drive shaft 74 of the motor 16. A user can engage a switch to activate the motor 16, which will subsequently rotate the threaded rod 72 in a first direction and move the mobile wedge 18 to an extended position. The motor 16 can also be activated to rotate the threaded rod 72 in a second direction, which consequently moves the mobile wedge 18 to a retracted position, as disclosed herein. The retracted position and extended position of the threaded rod 72 correlate directly with the deployed and non-deployed positions of the imaging device 24, respectively. A first limit switch 80 is disposed proximate the first side wall 36 of the elongate housing 12 and deactivates the motor 16 when the mobile wedge 18 has reached the extended position. A second limit switch 82 is disposed proximate a motor mount plate 84 adjacent to the motor 16. The second limit switch 82 deactivates the motor 16 when the mobile wedge 18 has reached the retracted position.

Referring again to the embodiment of FIGS. 1-8, the motor 16 is disposed between the second side wall 38 of the elongate housing 12 and the motor mount plate 84. When the motor 16 is activated by a user, the motor 16 rotates the threaded rod 72, thereby drawing the mobile wedge 18 toward the motor 16. As the mobile wedge 18 is drawn toward the motor 16, the keyed imaging device support 62 slides along the slanted wall 56 of the mobile wedge 18 such that the imaging device 24 moves away from the rear wall 34 of the elongate housing 12 and begins to protrude into a barrel 90 on the cover plate 33. As the imaging device 24 moves into the barrel 90 on the cover plate 33, the imaging device 24 contacts the flexible boot 20. The flexible boot 20 includes an upper lip 94 and a lower lip 96. The upper lip 94 includes an opening edge 95 and the lower lip 96 includes an opening edge 97. The barrel 90 generally defines the image device aperture 14. The upper lip 94 and the lower lip 96 of the flexible boot 20 generally define the flexible opening 22. The upper lip 94 extends over the lower lip 96 in a shingled fashion to minimize the likelihood of fluid leaking into the elongate housing 12 from between the upper and lower lips 94, 96. The lower lip 96 includes a contact surface 100 (FIG. 6) with a concave shape that is complementary to the lens 64 of the imaging device 24. The contact surface 100 is configured to sweep across the imaging device 24 from a top portion of the lens 64 to a bottom portion of the lens 64, when the imaging device 24 is moving from the non-deployed position to the deployed position. The contact surface 100 wipes any debris from the lens 64 that may have attached with the lens 64 when the imaging device 24 was in the non-deployed position. At the same time, the upper lip 94 separates from the lower lip 96 such that the lens 64 of the imaging device 24 protrudes forward relative to the flexible boot 20 between the upper and lower lips 94, 96 through the flexible opening 22. The imaging device 24 is now in a condition to receive image data and relay that image data to a controller and ultimately to a display. It is contemplated that the contact surface 100 could be positioned on the upper lip 94 and sweep across the lens 64 from a top portion of the lens 64 to a bottom portion of the lens 64. It is also contemplated that the contact surface 100 can be impregnated with a silicon (or silicon based material or other similar material) to replenish or restore a low surface tension to the lens 64.

Figure 5:
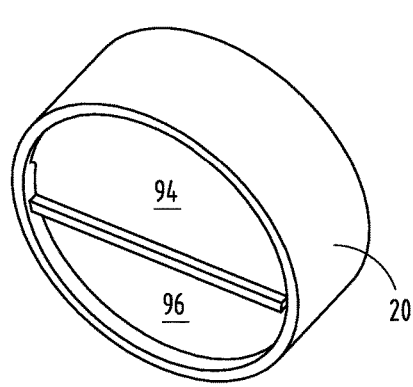
FIG. 5 is a front top perspective view of a flexible boot.
Figure 5A:
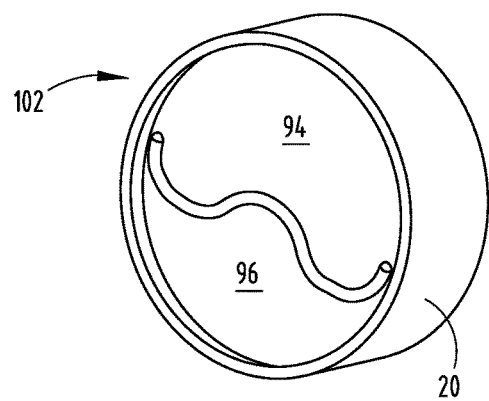
FIG. 5A is a front top perspective view of another embodiment of a flexible boot.
Figure 6:
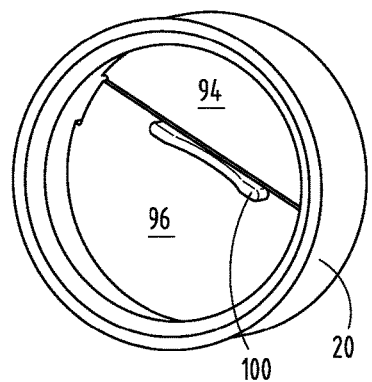
FIG. 6 is a rear bottom perspective view of a flexible boot.
Figure 7:
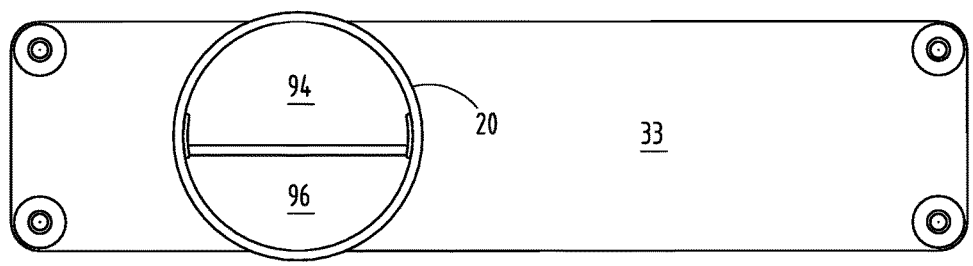
FIG. 7 is a front elevational view of the imaging device of FIG. 1 in an open position.

In another embodiment, as illustrated in FIG. 5A, the upper lip 94 and the lower lip 96 of the flexible boot 20 include a sinusoidal construction 102. The sinusoidal construction 102 of the upper and lower lips 94, 96 allows for the lens 64 to extend through an intermediate portion of the flexible boot 20 without separating the lapped orientation of the upper and lower lips 94, 96.

It is contemplated that the flexible boot 20 may be constructed of Buna-N rubber, urethane, silicon, ethylene propylene diene monomer (EPDM), or neoprene. Further, the flexible boot 20 may be constructed to be petroleum/gasoline resistant, ultraviolet (UV) light resistant, tear/puncture resistant, abrasion resistant, particulate absorption resistant (the flexible boot 20 is resistant to absorption of sand or dirt), and weather resistant. The flexible boot 20 can maintain flexibility at high and low temperatures and be resistant to water absorption. In addition, the flexible boot 20 can be constructed from materials that are flame resistant, vandalism/tamper resistant, and fade resistant, such that the color of the device will not change over time.

When a user no longer wishes to use the imaging device 24, the user can again operate the switch to send a signal to the motor 16 to rotate the threaded rod 72 in the second direction. As the threaded rod 72 rotates in the second direction, the threaded rod receiver 70, and consequently the mobile wedge 18, are pushed away from the motor 16. As the mobile wedge 18 moves away from the motor 16, the keyed imaging device support 62 slides down the slanted wall 56 of the mobile wedge 18 into the cavity 48 defined by the elongate housing 12 and cover plate 33, thereby simultaneously drawing the imaging device 24 inward. Consequently, the imaging device 24 and the lens 64 are withdrawn between the upper and lower lips 94, 96 to the non-deployed position, such that the imaging device 24 is no longer visible. As the imaging device 24 is being withdrawn, the contact surface 100 on the upper lip 94 sweeps downward across the lens 64 to remove any fluid or debris that may have collected on the lens 64 while the imaging device 24 was deployed.

Referring now to FIGS. 9-13, another embodiment of the present invention is illustrated. An imaging device enclosure 200 includes an elongate housing 202 having a rear wall 204, first and second side walls 206, 208, a top wall 210, and a bottom wall 212. The elongate housing 202 is adapted to support an imaging device 213 therein. The elongate housing 202 is configured for connection with a cover plate 214 having a bulbous projection 216 extending therefrom that is partially covered by a shutter 217. The bulbous projection 216 includes a lens aperture 219. The imaging device enclosure 200 includes a motor 218 disposed inside the elongate housing 202 between the first side wall 206 and a motor mount plate 220. The motor 218 includes a drive shaft 222 that is operably connected with a gear assembly 224 that is, in turn, operably connected to the imaging device 213. The drive shaft 222 of the motor 218 is operably connected with a translation gear 229 configured to translate the vertical rotation of the drive shaft 222 to horizontal rotation of rotary gears 232 on rotary shafts 230. The rotary shafts 230 are supported in the elongate housing 202 by bearings 231. The rotary gears 232 engage shutter gears 234 that are rotatably connected with pivot pins 240. The rotary gears 232 are configured to rotate the shutter gears 234, which consequently rotate the pivot pins 240. The pivot pins 240 are located on a top portion and a bottom portion of the shutter 217 and rotate with the shutter gears 234. The pivot pins 240 operably connect the shutter gears 234 to the shutter 217 such that rotation of the shutter gears 234 results in rotation of the shutter 217.

The gear assembly 224 is operably connected and moves with the shutter 217, but does not move the imaging device 213, which maintains a static position on housing supports 239 inside the bulbous projection 216 of the cover plate 214. The shutter 217 has a substantially arcuate construction and is rotatably connected with the cover plate 214. Further, the shutter 217 has a size and shape to complement and partially cover the bulbous projection 216 on the cover plate 214. In the illustrated embodiment, both the bulbous projection 216 and the shutter 217 are substantially arcuate, although other shapes and configurations are contemplated. The shutter 217 is movable between an unobstructing position and an obstructing position. The shutter 217 includes a fluid port 241 configured for connection with a fluid conduit 242. The fluid conduit 242 is configured to provide fluid from a fluid line and relay the fluid to the fluid port 241 to wash the imaging device 213. The shutter 217 also includes an elastic gasket 244 to substantially seal a lens 246 on the imaging device 213 when the shutter 217 is in the obstructing position.

When a user activates the imaging device 213, the user engages a switch connected with the motor 218. Consequently, the motor 218 activates, thereby turning the drive shaft 222 and translation gear 229. The translation gear 229, in turn, rotates the rotary gears 232 on the rotary shafts 230, which rotate the shutter gears 234. As the shutter gears 234 rotate, the pivot pins 240 rotate and the shutter 217 moves from the obstructing position to the unobstructing position. When the shutter 217 is in the unobstructing position, the shutter 217 is angled away from a lens 246 at approximately a 45 degree angle relative to the elongate housing 202. When the shutter 217 moves to the unobstructing position (FIG. 13), the shutter 217 does not block the lens 246 of the imaging device 213. When the user desires to deactivate the imaging device 213, the user simply actuates the switch connected with the motor 218 a second time. The motor 218 once again activates, thereby turning the drive shaft 222 and translation gear 229. The translation gear 229, in turn, rotates the rotary gears 232 on the rotary shafts 230, which rotate the shutter gears 234. As the shutter gears 234 rotate, the pivot pins 240 rotate, thereby moving the shutter 217 from the unobstructing position to the obstructing position. When the shutter 217 is in the obstructing position (FIGS. 9 and 12), the shutter 217 is disposed over the lens 246 at approximately a 90 degree angle relative to the elongate housing 202. When the shutter 217 moves to the obstructing position, the shutter 217 blocks the lens aperture 219 of the bulbous projection 216 and the lens 246. It is also contemplated that the shutter 217 may move between a first unobstructing position, an obstructing position, and a second unobstructing position. In this instance, the shutter 217 rotates to a first side of the bulbous projection 216 when in the first unobstructing position, and rotates to a second side of the bulbous projection 216 when in the second unobstructing position. The shutter 217 can also move to a variety of intermediate positions.

Referring now to FIGS. 14-18, yet another embodiment of the present invention is illustrated. An imaging device enclosure 300 includes a rectangular base 302 connected with a shutter housing 304. The rectangular base 302 includes a top wall 306, a bottom wall 308, first and second side walls 310, 312, and a rear wall 314, which generally define a cavity 316. A motor 318 is disposed in the cavity 316 and is operably connected with a first end 319 of a cylindrical shutter tube 320. The cylindrical shutter tube 320 has a shape that is substantially complementary to the shutter housing 304, but has a larger diameter than the shutter housing 304. The cylindrical shutter tube 320 includes a lens aperture 322 configured to align with a lens 324 of an imaging device 326. The imaging device 326 is disposed inside the shutter housing 304 and cylindrical shutter tube 320 and is slidably supported on an imaging device mount 330. The imaging device 326 and imaging device mount 330 are disposed inside of the shutter housing 304 and cylindrical shutter tube 320. The lens 324 of the imaging device 326 protrudes into a lens opening 331 of the shutter housing 304. The imaging device mount 330 includes an engagement member 332 that protrudes away from the motor 318 in a direction parallel with the longitudinal extent of the cylindrical shutter tube 320 and is slidably received in an arcuate cam slot 336 disposed in a lift cam 338 proximate a second end 339 of the cylindrical shutter tube 320. As noted herein, the lift cam 338 moves the imaging device 326 between a deployed position and a non-deployed position when the motor 318 is activated. The deployed position and the non-deployed position of the imaging device 326 correspond with a lowered position and a raised position of the cylindrical shutter tube 320. The imaging device 326 can also be positioned at a variety of intermediate positions between the deployed and non-deployed positions.

In the event a user desires to activate the imaging device 326, the user simply engages a switch that is operably coupled with the motor 318. When activated, the motor 318 turns a drive shaft 340 in a first direction, which consequently rotates a drive gear 342. The drive gear 342 rotates a planetary gear 344 operably connected to an outside actuator mount 346 and an inside actuator mount 347. The outside actuator mount 346 is attached to the cylindrical shutter tube 320. Thus, when the motor 318 rotates, so does the drive gear 342, the planetary gear 344, the inside actuator mount 347, and the outside actuator mount 346. As the outside actuator mount 346 rotates, the cylindrical shutter tube 320 rotates to the raised position and the cylindrical shutter tube 320 rotates the lift cam 338. The arcuate cam slot 336 of the lift cam 338 is engaged with the engagement member 332 and moves the imaging device 326 laterally away from the rear wall 314 of the rectangular base 302 in the direction of arrow X. Consequently, the imaging device mount 330 moves forward toward the lens aperture 322 of the cylindrical shutter tube 320 by sliding on rear lateral supports 350. As the drive gear 342 rotates, the planetary gear 344 rotates about a pivot axle 352 until a contact tab 354 engages a top limit pin 356. When the contact tab 354 engages the top limit pin 356, the motor 318 is deactivated. When the contact tab 354 is engaged with the top limit pin 356, the cylindrical shutter tube 320 is in the raised position. In the raised position, the lens aperture 322 of the cylindrical shutter tube 320 is aligned with the lens 324 of the imaging device 326. Consequently, the image data may be taken by the imaging device 326.

In the event the user wishes to deactivate the imaging device 326, the user again engages the switch operably coupled with the motor 318. When activated, the motor 318 once again turns the drive shaft 340 but in a second direction opposite the first direction, which consequently rotates the drive gear 342. The drive gear 342 rotates the planetary gear 344 and the cylindrical shutter tube 320. As the cylindrical shutter tube 320 rotates to the lowered position, the cylindrical shutter tube 320 rotates the lift cam 338 downward. The lift cam 338 moves the imaging device 326 laterally toward the rear wall 314 of the rectangular base 302 in the direction of arrow Y. Consequently, the imaging device mount 330 slides on the rear lateral support 350 and moves away from the lens aperture 322 of the cylindrical shutter tube 320. As the drive gear 342 rotates, the planetary gear 344 rotates about the pivot axle 352 until the contact tab 354 engages a bottom limit pin 360. When the contact tab 354 engages the bottom limit pin 360, the motor 318 is deactivated. When the contact tab 354 is engaged with the bottom limit pin 360, the cylindrical shutter tube 320 is in the lowered position.

When the motor 318 is actuated a second time, the cylindrical shutter tube 320 is rotated downward approximately 60 degrees to the lowered position. Simultaneously, in one embodiment, an inside portion of the cylindrical shutter tube 320 wipes the lens 324, thereby removing particulates, fluid, and debris that may have landed on the lens 324.

Figure 19:
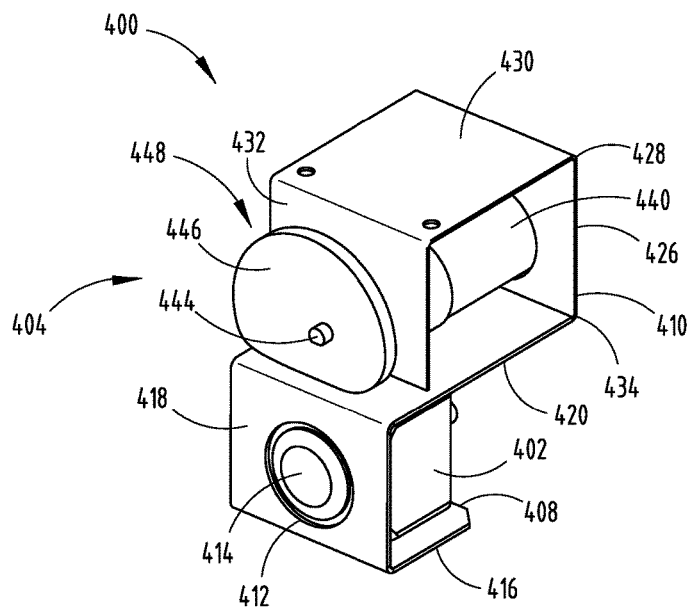
FIG. 19 is a top perspective view of another embodiment of an imaging device enclosure of the present invention with an imaging device in a raised position.
Figure 20:
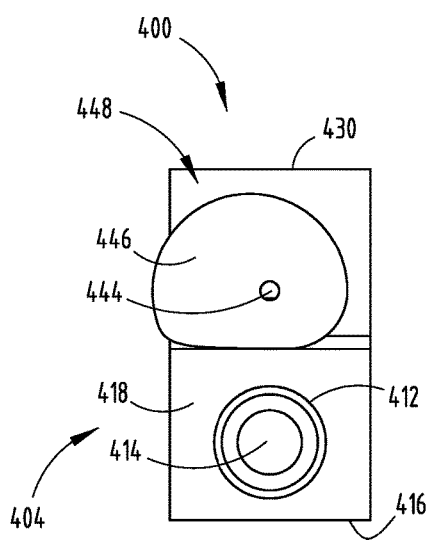
FIG. 20 is a front elevational view of the imaging device enclosure of FIG. 19.
Figure 21:
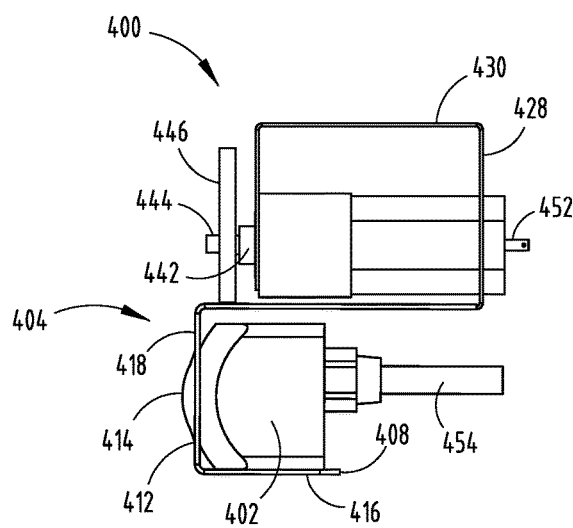
FIG. 21 is a side elevational view of the imaging device enclosure of FIG. 19.
Figure 19A:
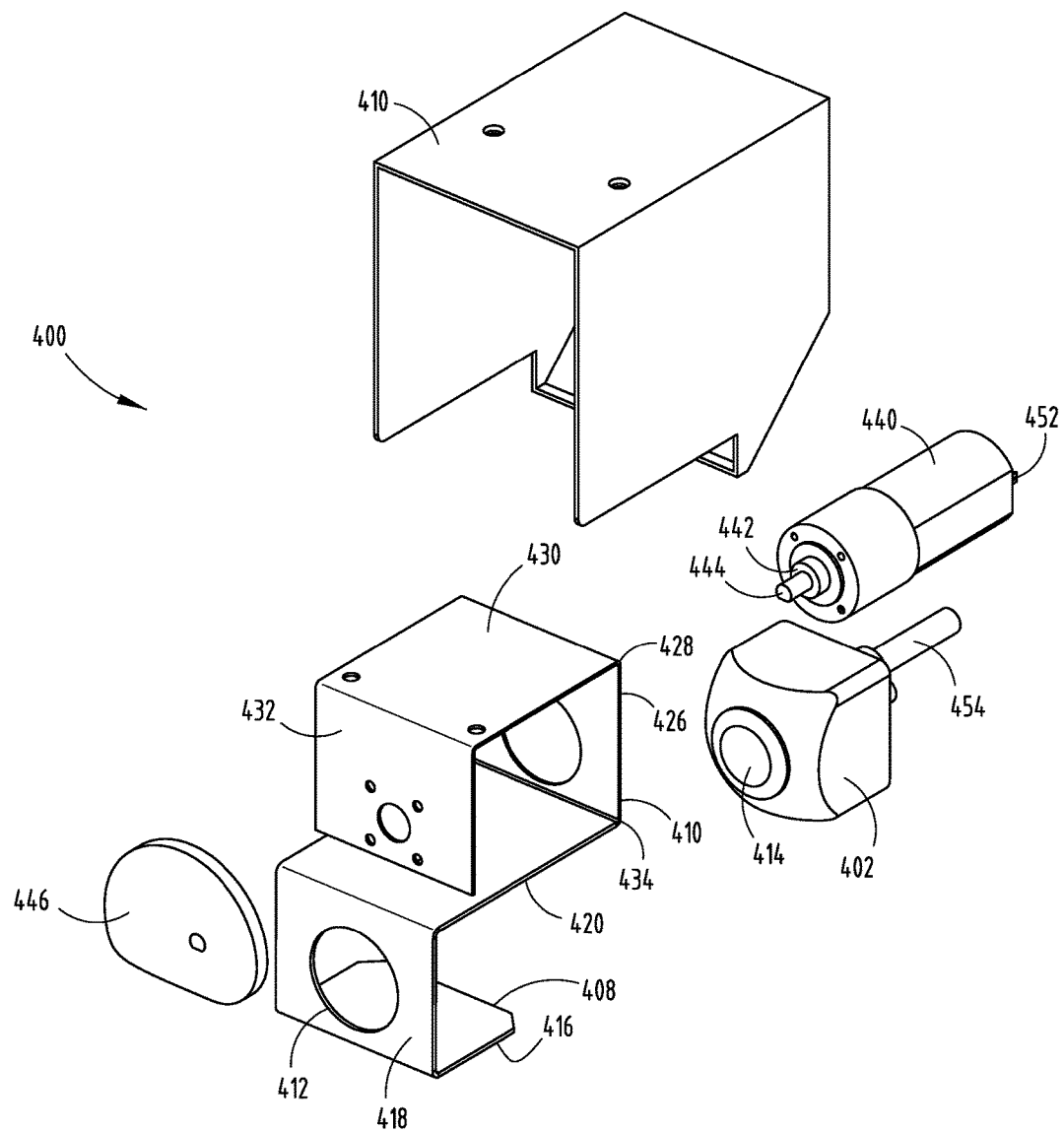
FIG. 19A is a top perspective exploded view of the imaging device enclosure of FIG. 19.

Referring now to FIGS. 19-21, still another embodiment of the present invention includes an imaging device enclosure 400 having an imaging device 402 that is operable between a stowed position 404 and a deployed position 406. In the stowed position 404, the imaging device 402 extends substantially horizontally. In the deployed position 406, the imaging device 402 extends at a downward angle, thereby exposing the lens 414 of the imaging device 402. The imaging device 402 is disposed in a lower portion 408 of a housing 410. The lower portion 408 of the housing 410 defines a lens aperture 412 for receiving a lens 414 of the imaging device 402. The lower portion 408 of the housing 410 includes a support flange 416, a forward wall 418, and an intermediate wall 420. The lens aperture 412 is disposed in the forward wall 418. The intermediate wall 420 is orthogonally coupled with the forward wall 418 of the lower portion 408 and pivotally connected to a rear wall 426 of an upper portion 428 of the housing 410. The construction of the housing 410 includes a spring force that biases the lower portion 408 to the stowed position 404. In one embodiment, the rear wall 426 is coupled to the intermediate wall 420 via a living hinge 434. The upper portion 428 of the housing 410 includes the rear wall 426, as well as a top wall 430 and a front wall 432.

Referring again to FIGS. 19-21, a motor 440 is disposed between the front wall 432 and the rear wall 426 and includes a drive shaft 442 that extends forwardly therefrom through the front wall 432. It is contemplated that the motor 440 could be replaced with or supplemented by a solenoid or like device. A distal end 444 of the drive shaft 442 is connected with a cam 446 that is operable between a first position 448 and a second position 450. The entire imaging device enclosure 400 is configured for installation into a vehicle. In one embodiment, the imaging device enclosure 400 is positioned on a rear panel or a trunk of a vehicle proximate a trunk latch. The trunk defines an overhang 451 in which the imaging device enclosure 400 is disposed. The imaging device enclosure 400 is generally configured to expose the lower portion 408 of the housing 410 when the imaging device 402 is in the deployed position 406 and conceals the housing 410 when the imaging device 402 is in the stowed position 404. At the same time, the lens 414 of the imaging device 402 is exposed such that image data can be captured by the imaging device 402. The imaging device enclosure 400 is configured to move the lens 414 only a short distance between the stowed and deployed positions 404, 406. The motor 440 includes a plug 452 for receiving power. In addition, the imaging device 402 includes a power and data line 454 for conveying image data to a display in or on the vehicle.

Figure 22:
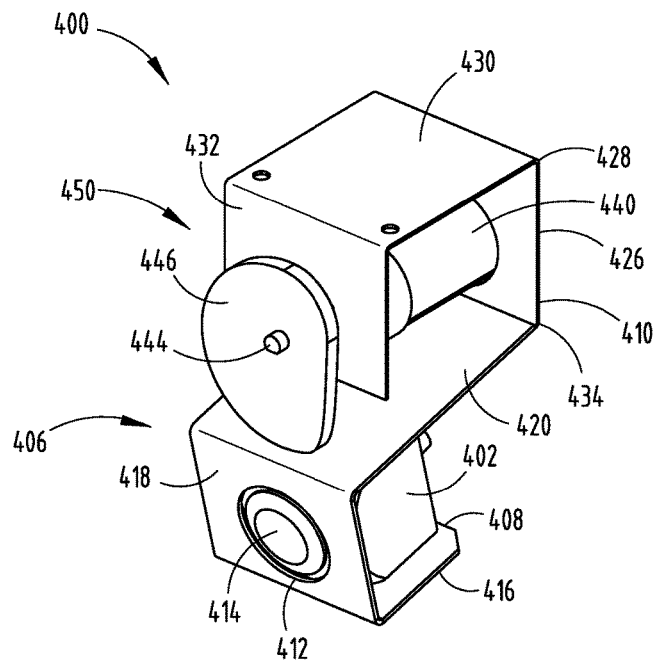
FIG. 22 is a top perspective view of the imaging device enclosure of FIG. 19 with the imaging device in a lowered position.
Figure 23:
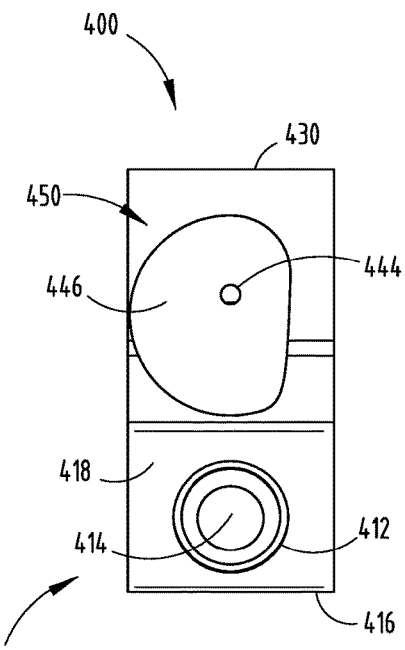
FIG. 23 is a front elevational view of the imaging device enclosure of FIG. 22.
Figure 24:
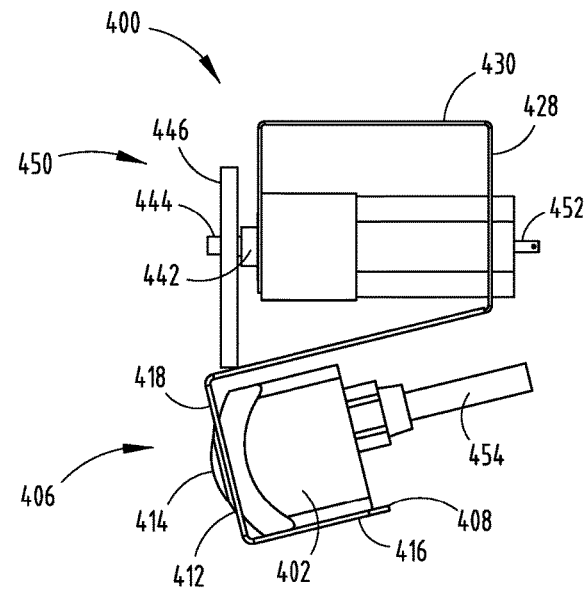
FIG. 24 is a side elevational view of the imaging device enclosure of FIG. 22.
Figure 25:
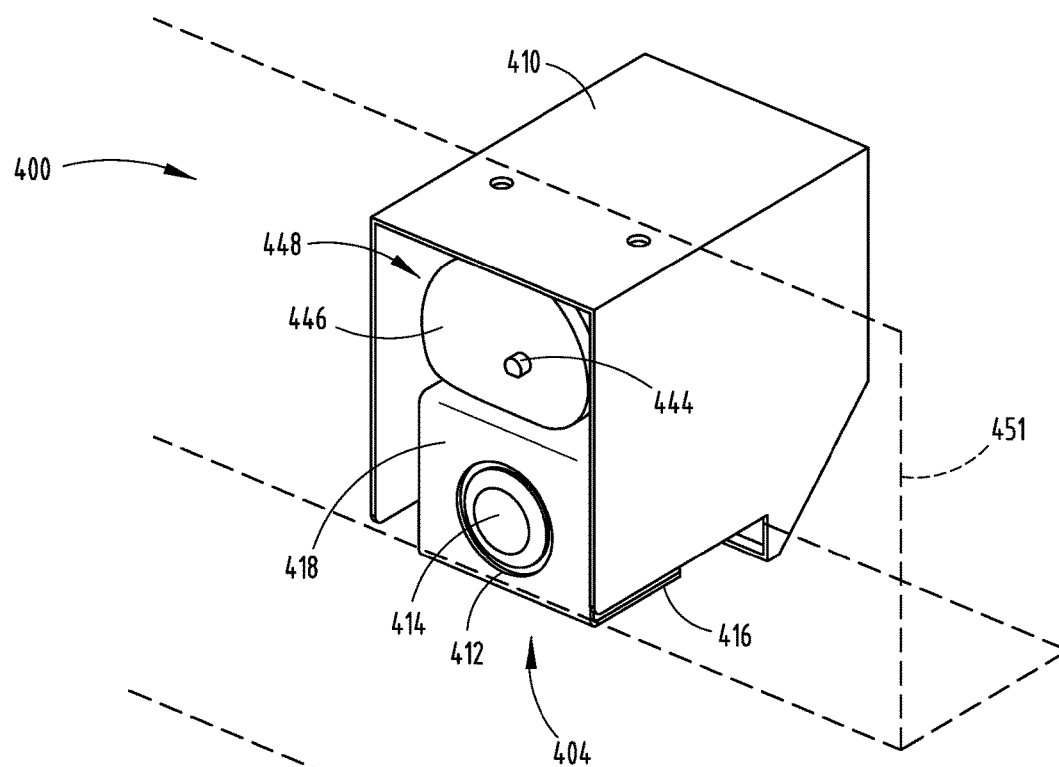
FIG. 25 is a top perspective view of an imaging device enclosure positioned in a license plate shelf defined in a rear portion of a vehicle.
Figure 25A:
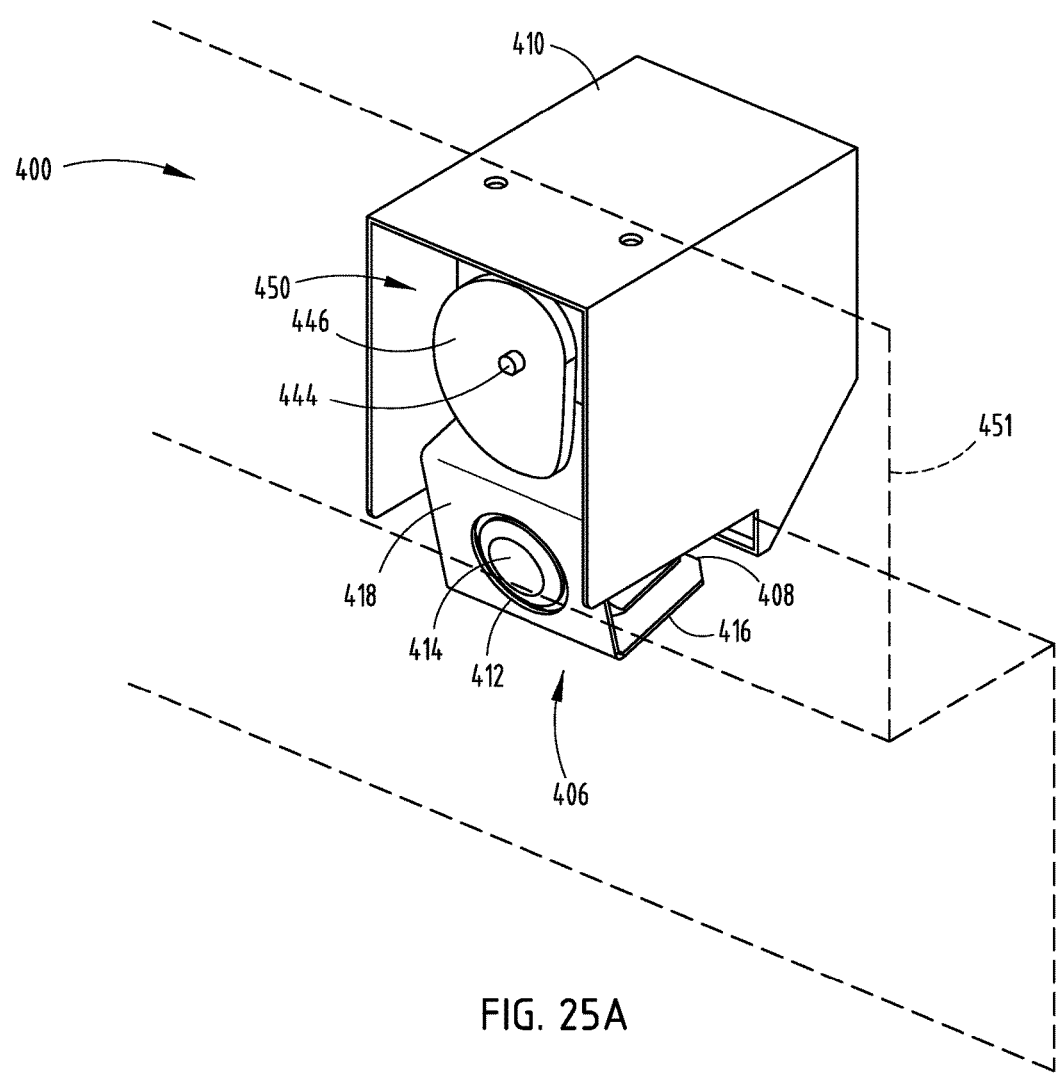
FIG. 25A is a top perspective view of the imaging device enclosure of FIG. 25 with the imaging device in the lowered position.
Figure 26:
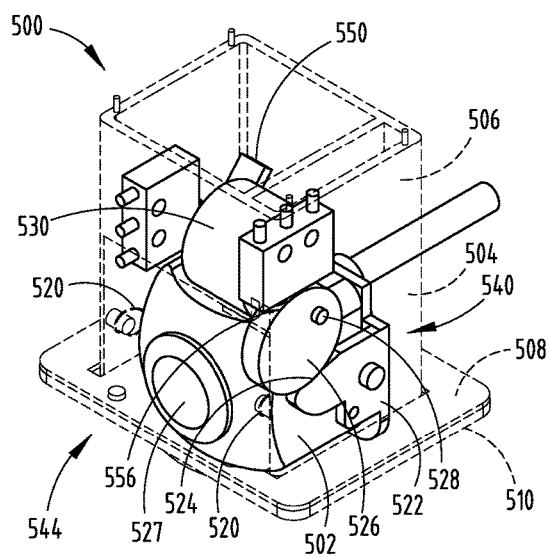
FIG. 26 is a top perspective view of another embodiment of an imaging device enclosure of the present invention with an imaging device in a raised position.
Figure 27:
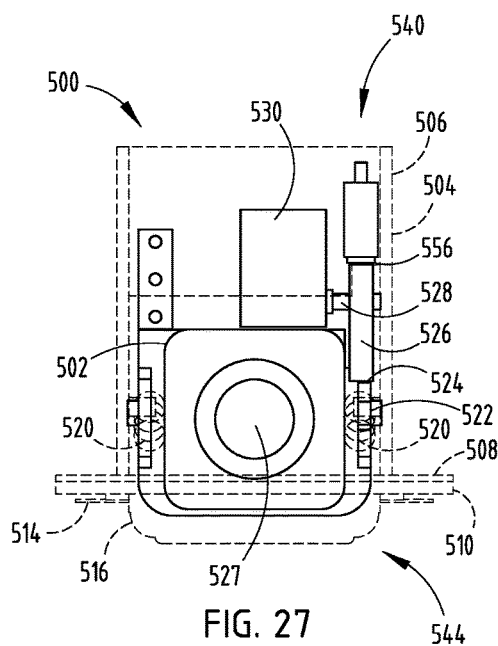
FIG. 27 is a front elevational view of the imaging device enclosure of FIG. 26.
Figure 28:
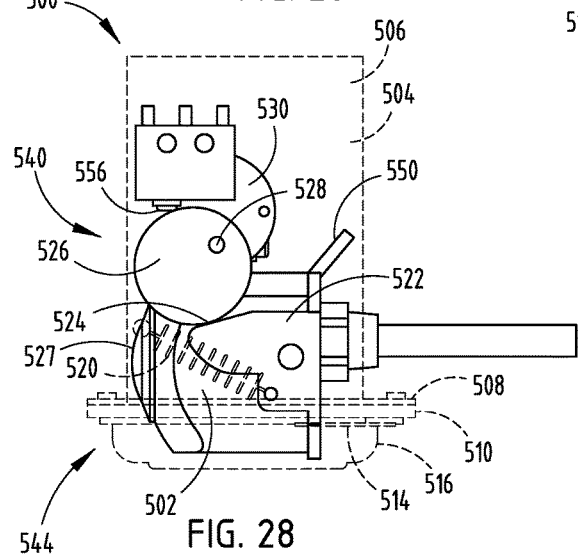
FIG. 28 is a first side elevational view of the imaging device enclosure of FIG. 26.
Figure 28A:
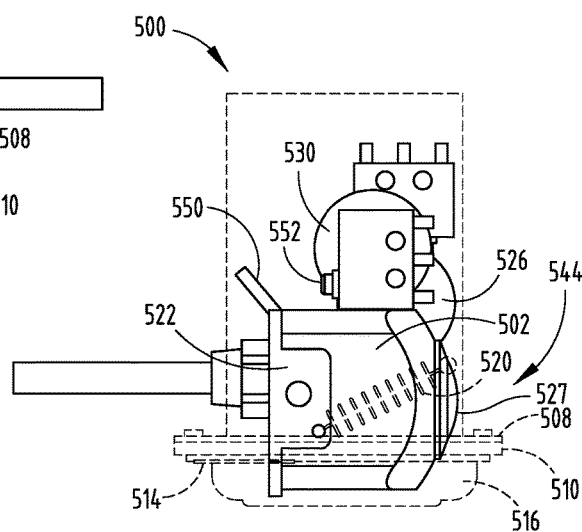
FIG. 28A is a second side elevational view of the imaging device enclosure of FIG. 26.
Figure 26A:
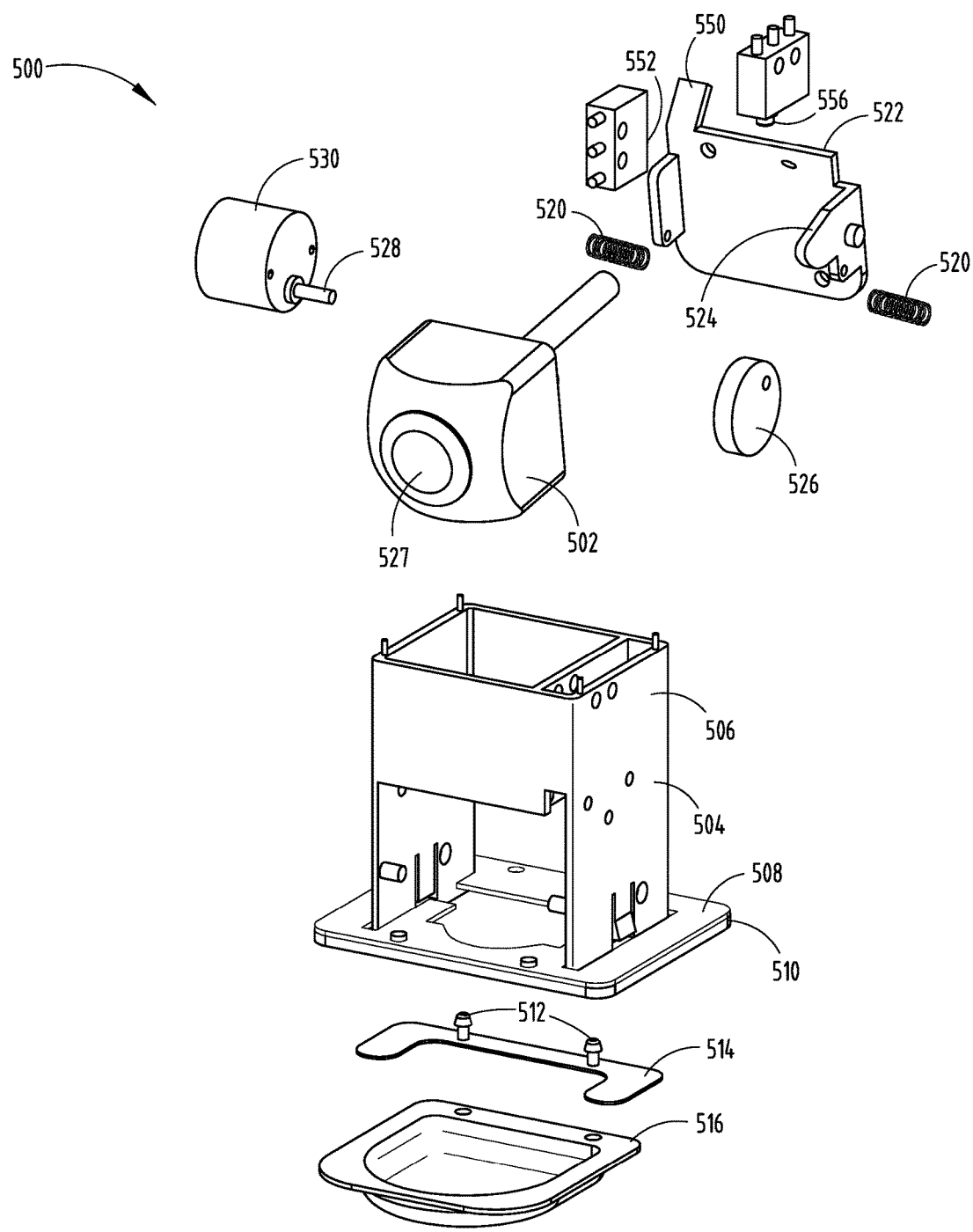
FIG. 26A is a top exploded perspective view of the imaging device enclosure of FIG. 26.
Figure 29:
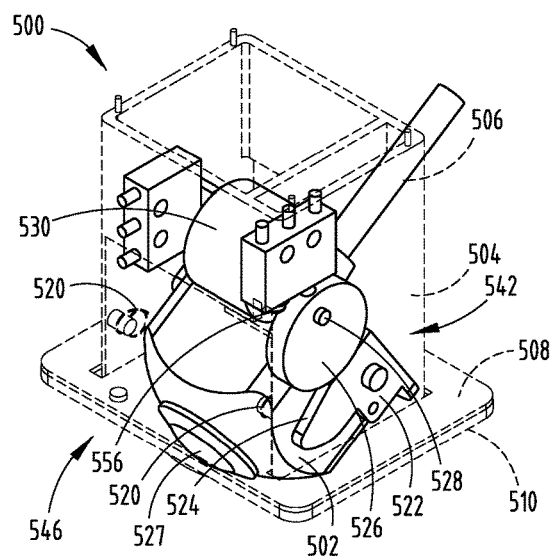
FIG. 29 is a top perspective view of the imaging device enclosure of FIG. 26 with the imaging device in the lowered position.
Figure 30:
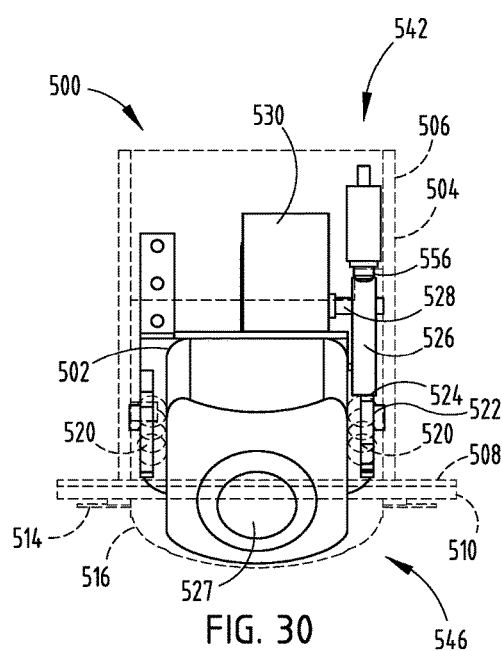
FIG. 30 is a front elevational view of the imaging device enclosure of FIG. 29.
Figure 31:
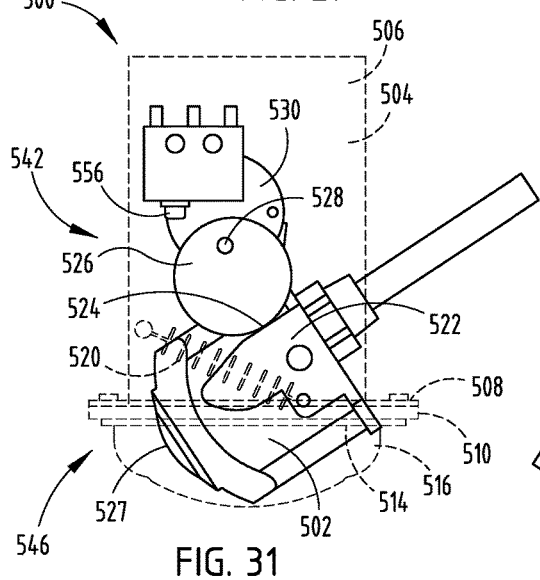
FIG. 31 is a first side elevational view of the imaging device enclosure of FIG. 29.
Figure 31A:
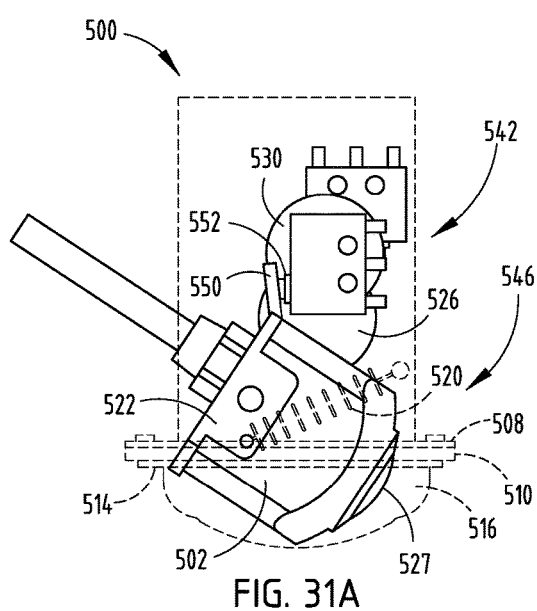
FIG. 31A is a second side elevational view of the imaging device enclosure of FIG. 29.
Figure 32:
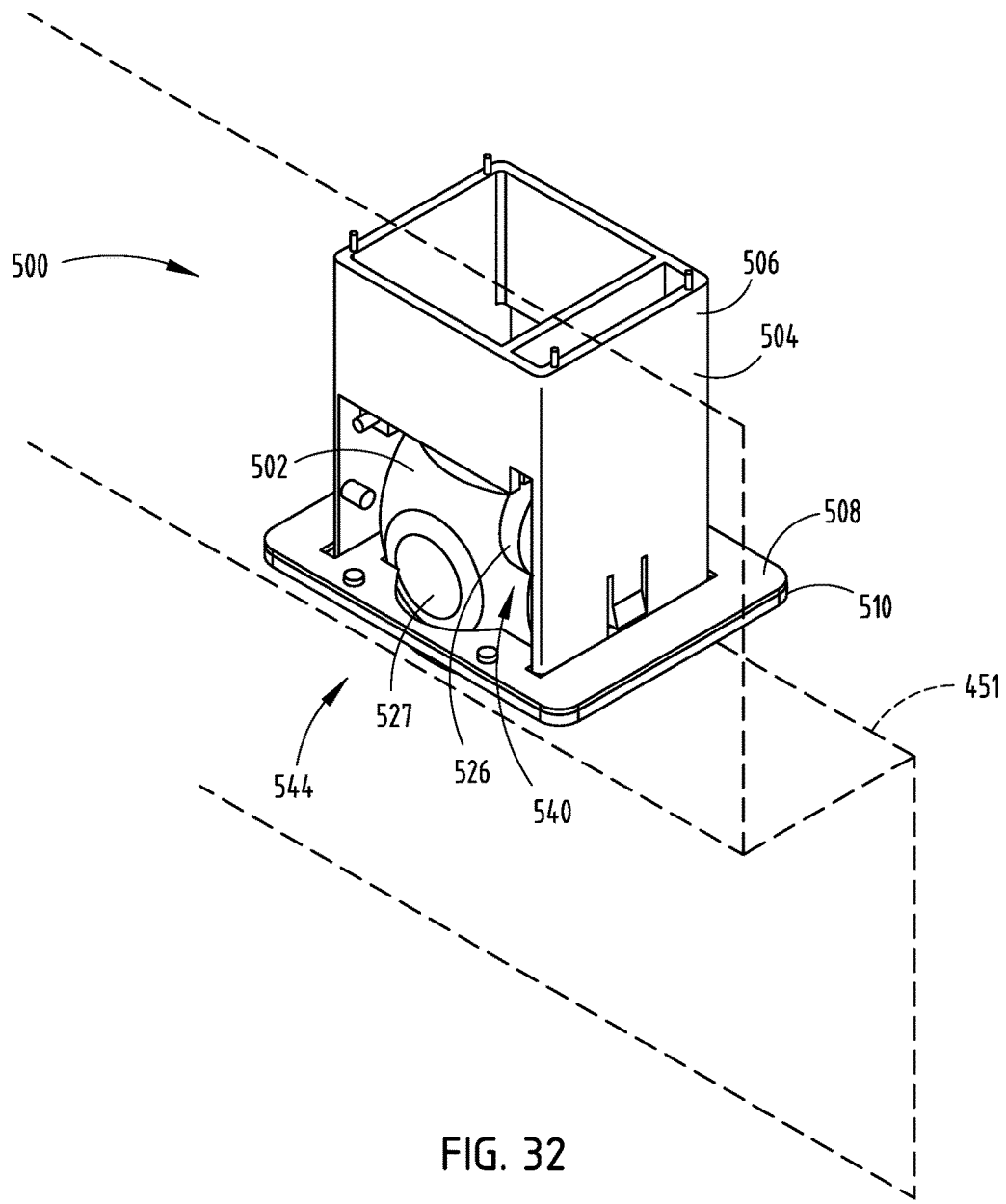
FIG. 32 is a top perspective view of the imaging device enclosure of the present invention in a license plate shelf of a vehicle.
Figure 32A:
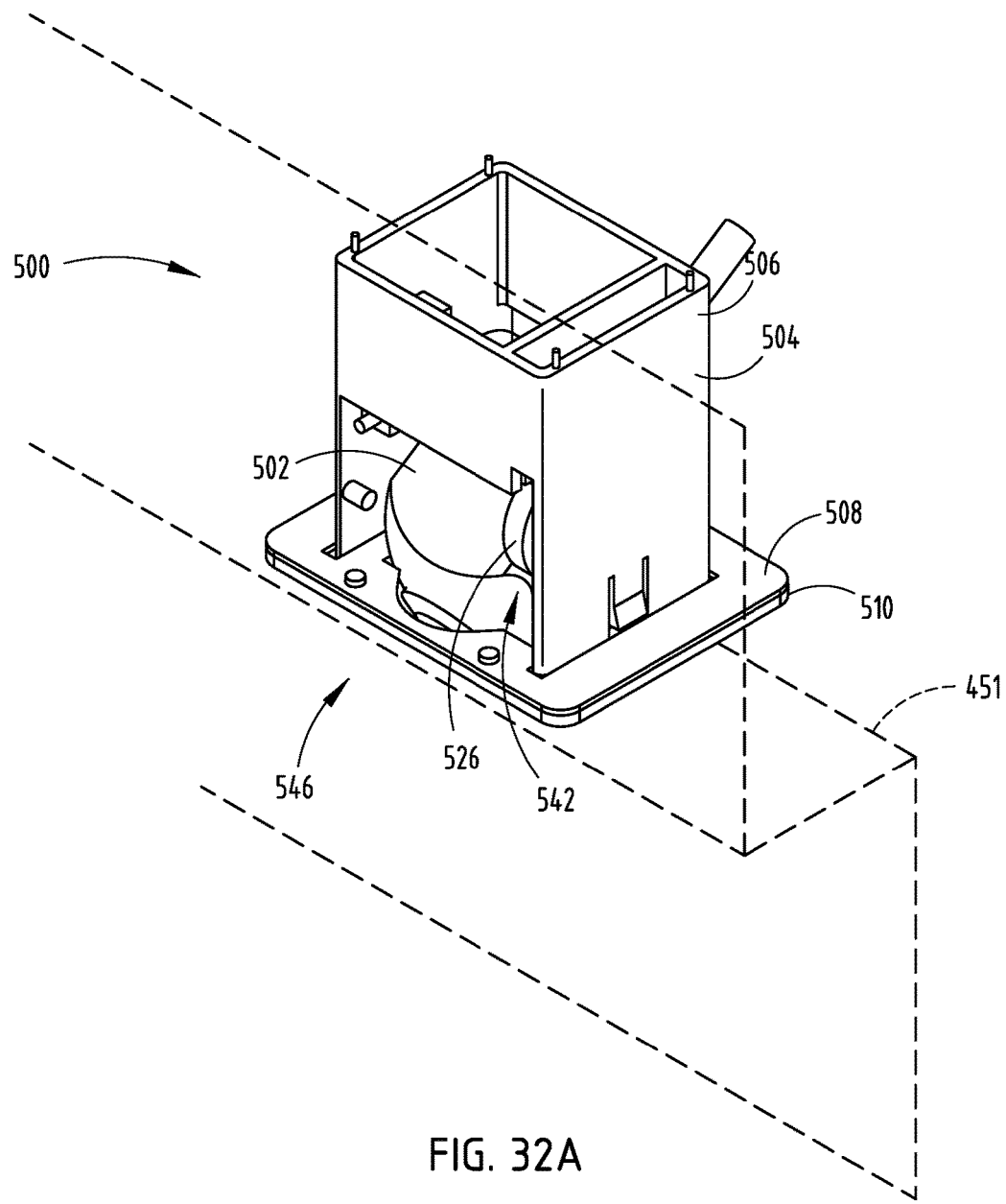
FIG. 32A is a top perspective view of the imaging device enclosure of FIG. 32 with the imaging device in the lowered position.

Referring now to FIGS. 22-25A and as noted above, the cam 446 is operable between the first position 448 and the second position 450. When the cam 446 is in the first position 448, the imaging device 402 is in the stowed position 404. When the cam 446 is moved to the second position 450, the cam 446 forces the lower portion 408 of the housing 410 downward, such that the imaging device 402 moves to the deployed position 406. For example, one method of utilizing the imaging device enclosure 400 includes a user activating the imaging device 402. A user simply activates the motor 440, which subsequently rotates the drive shaft 442. When the drive shaft 442 rotates, the cam 446 rotates, forcing the lower portion 408 of the housing 410 downward. The cam 446 can be positioned in a track on the intermediate wall 420 to prevent the imaging device 402 from entering the deployed position 406 accidentally. However, as shown in FIG. 22, the cam 446 simply abuts the intermediate wall 420. When the lower portion 408 moves downward, the imaging device 402 is exposed and activated so that image data can be obtained and relayed to vehicle passengers. It is contemplated that the housing 410 can be constructed of plastic or metal. Additionally, the living hinge 434 could be replaced with a spring-biased assembly or a hinge assembly.

Referring now to FIGS. 26-32A, in yet another embodiment of the present invention, an imaging device enclosure 500 includes an imaging device 502 that is disposed inside a housing 504. The housing 504 includes a tower 506 positioned on a support plate 508. A rim 510 is positioned beneath the tower 506 and the support plate 508 and is connected via securing fasteners 512 to a flexible support 514 that is in contact with a trap door 516. The imaging device 502 is generally positioned inside the housing 504. Biasing members 520 are operably connected with an imaging device plate 522 on the imaging device 502. The imaging device plate 522 includes a cam engagement surface 524 that is designed to engage a cam 526 operably connected with a drive shaft 528 of a motor 530. The motor 530 is configured to rotate the cam 526 between first and second positions 540, 542 that correlate with raised and deployed positions 544, 546 of the imaging device 502.

Referring to FIGS. 26-28A, the activation of the imaging device enclosure 500 by a user subsequently activates the motor 530. When the motor 530 activates, the drive shaft 528 is rotated, which consequently rotates the cam 526 against the cam engagement surface 524 of the imaging device plate 522. As the cam 526 rotates downward, the cam engagement surface 524 is forced downward along with the imaging device 502, thereby exposing a lens 527 of the imaging device 502. As the imaging device 502 is forced downward, the imaging device 502 moves from the stowed position 544 into the deployed position 546. The lens 527 of the imaging device 502 is now in position to receive image data from a rear portion of a vehicle. When the imaging device 502 has reached the deployed position 546, an engagement member 550 that extends from the imaging device plate 522 contacts a kill switch 552 operably connected with the motor 530. The kill switch 552 disengages the motor 530 such that the imaging device 502 stays in the deployed position 544. Upon activation of the motor 530 once again by a user, the cam 526 rotates away from the cam engagement surface 524 and ultimately contacts a second kill switch 556 when the imaging device 502 has reached the stowed position 544. The imaging device 502 is spring-biased by the biasing members 520 such that the imaging device 502 is urged to the stowed position 544. Once in the stowed position 544, the lens 527 is hidden from view. When the imaging device 502 is in the stowed position 544, the trap door 516 is closed, such that dirt, debris, and light cannot penetrate into the housing 504.

The imaging device enclosures discussed herein can be used in conjunction with roof mounted imager modules, such as those disclosed in U.S. Patent Application Publication No. 2012/0327234, filed on Jun. 19, 2012, now U.S. Pat. No. 9,838,653, entitled "ROOF MOUNTED IMAGER MODULE." Moreover, the imaging device enclosures can be used in conjunction with other lens cleaning systems, including those disclosed in U.S. Patent Application Publication No. 2012/0243093, filed on Mar. 23, 2012, now U.S. Pat. No. 8,899,761, entitled "LENS CLEANING APPARATUS."

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An imaging device enclosure comprising:
   a housing disposed on an external panel of a vehicle, the housing having a bulbous projection;
   an imaging device at least partially disposed in the bulbous projection;
   a shutter disposed over the bulbous projection and operable between an obstructing position and an unobstructing position, wherein the shutter remains substantially exposed in both the obstructing position and unobstructing position;
   a lens disposed in the bulbous projection, wherein a gasket complements the shape of the lens and seals against the lens when the shutter is in the obstructing position; and
   a motor disposed in the housing and operably connected with the shutter, wherein actuation of the motor moves the shutter from the obstructing position to the unobstructing position.

2. The imaging device enclosure of claim 1, further comprising:
   a gear assembly that connects the motor with the shutter.

3. The imaging device enclosure of claim 1, wherein the bulbous projection is substantially hemispherically-shaped.

4. The imaging device enclosure of claim 1, wherein the shutter is substantially arcuately-shaped.

5. The imaging device enclosure of claim 1, wherein the motor is secured between a side wall of the housing and a motor mount plate.

6. The imaging device enclosure of claim 1, wherein the shutter includes a contact surface that sweeps across the imaging device when moving from the obstructing position to the unobstructing position.

7. The imaging device enclosure of claim 1, wherein the shutter includes a fluid port adapted to discharge fluid onto the imaging device.

8. The imaging device enclosure of claim 1, further comprising:
   pivot pins extending on opposing sides of the bulbous projection, wherein the pivot pins rotate the shutter between the obstructing and unobstructing positions.

9. The imaging device enclosure of claim 1, further comprising:
   intermediary rotary gears disposed between a translation gear attached to a drive shaft of the motor; and
   shutter gears coupled to the shutter, wherein the shutter gears rotate the shutter between the obstructing and unobstructing positions.

10. An imaging device enclosure comprising:
    a housing disposed on an external panel of a vehicle;
    an imaging device at least partially disposed in the housing;
    a shutter disposed on the housing and moveable between an obstructing position and an unobstructing position, wherein the imaging device includes a lens, and wherein the shutter remains substantially exposed in both the obstructing position and unobstructing position, and further wherein a gasket complements the shape of the lens and seals against the lens when the shutter is in the obstructing position; and
    a motor disposed in the housing and operably connected with the shutter, wherein actuation of the motor moves the shutter from the obstructing position to the unobstructing position.

11. The imaging device enclosure of claim 10, further comprising:
    a gear assembly that connects the motor with the shutter.

12. The imaging device enclosure of claim 10, wherein the shutter is substantially arcuately-shaped.

13. The imaging device enclosure of claim 10, wherein the motor is secured between a side wall of the housing and a motor mount plate.

14. The imaging device enclosure of claim 10, wherein the shutter includes a contact surface that sweeps across the imaging device when moving from the obstructing position to the unobstructing position.

15. The imaging device enclosure of claim 10, wherein the shutter includes a fluid port adapted to discharge fluid onto the imaging device.

16. The imaging device enclosure of claim 10, further comprising:
    intermediary rotary gears disposed between a translation gear attached to a drive shaft of the motor; and
    shutter gears coupled to the shutter, wherein the shutter gears rotate the shutter between the obstructing and unobstructing positions.

* * * * *